(12) United States Patent
Barton et al.

(10) Patent No.: US 8,577,205 B2
(45) Date of Patent: Nov. 5, 2013

(54) DIGITAL VIDEO RECORDING SYSTEM

(75) Inventors: James M. Barton, Alviso, CA (US);
Alan Moskowitz, Oakland, CA (US);
Andrew Martin Goodman, Menlo Park, CA (US)

(73) Assignee: TiVo Inc., Alviso, CA (US)

( * ) Notice: Subject to any disclaimer, the term of this patent is extended or adjusted under 35 U.S.C. 154(b) by 1959 days.

(21) Appl. No.: 10/418,646

(22) Filed: Apr. 18, 2003

(65) Prior Publication Data
US 2004/0013406 A1    Jan. 22, 2004

Related U.S. Application Data

(63) Continuation-in-part of application No. 09/827,029, filed on Apr. 5, 2001, now abandoned, which is a continuation of application No. 09/126,071, filed on Jul. 30, 1998, now Pat. No. 6,233,389.

(60) Provisional application No. 60/374,101, filed on Apr. 19, 2002.

(51) Int. Cl.
*H04N 5/76* (2006.01)
*H04N 9/80* (2006.01)
*H04N 5/93* (2006.01)
*H04N 5/917* (2006.01)
*H04N 5/765* (2006.01)
*H04N 7/16* (2011.01)

(52) U.S. Cl.
USPC ........... 386/291; 386/200; 386/239; 386/241; 386/248; 386/353; 386/354; 386/356; 386/357; 725/151; 725/153

(58) Field of Classification Search
USPC .............. 386/46, 125, 83, 109, 200–234, 386/239–248, 291–299, 353–357; 369/93; 370/498; 725/151–153
See application file for complete search history.

(56) References Cited

U.S. PATENT DOCUMENTS 2,865,990 A    12/1958  Towler
(Continued)

FOREIGN PATENT DOCUMENTS

CA    2 137 745    12/1994
(Continued)

OTHER PUBLICATIONS

United States Patent and Trademark Office, "Ex Parte Reexamination Communication Transmittal Form", Reexamination Control No. 90/007750, dated Nov. 28, 2007, 20 pages.

(Continued)

*Primary Examiner* — Hung Dang
(74) *Attorney, Agent, or Firm* — Hickman Palermo Truong Becker Binghan Wong LLP; Kirk D. Wong

(57) ABSTRACT

A digital video recorder (DVR) system with an integrated DVD recording device accepts TV input streams in a multitude of forms. Analog TV streams are converted to an MPEG formatted stream for internal transfer and manipulation, while pre-formatted MPEG streams are extracted from the digital TV signal and presented in a similar format. Indexes within the MPEG stream are determined and saved at predefined intervals and are stored on a hard disk along with the MPEG program material and used to create navigation packets when writing to a DVD inserted in an integrated DVD player/recorder. When a program is requested for display from the hard disk or the integrated DVD player/recorder, the program material are extracted from the appropriate source and reassembled into an MPEG stream which is sent to a decoder. The decoder converts the MPEG stream into TV output signals and delivers the TV output signals to a TV monitor. User control commands are accepted which affect the flow of the MPEG stream allowing the user to view stored programs with special functions: reverse, fast forward, play, pause, index, fast/slow reverse play, and fast/slow play. The user can select program material stored on the hard disk to be written to a DVD and can also select program material stored on a DVD to be transferred to the hard disk.

33 Claims, 17 Drawing Sheets

(56) References Cited

U.S. PATENT DOCUMENTS

| | | |
|---|---|---|
| 3,682,363 A | 8/1972 | Hull |
| 3,942,190 A | 3/1976 | Detwiler |
| 4,141,039 A | 2/1979 | Yamamoto |
| 4,221,176 A | 9/1980 | Besore |
| 4,224,481 A | 9/1980 | Russell |
| 4,233,628 A | 11/1980 | Ciciora |
| 4,258,418 A | 3/1981 | Heath |
| 4,306,250 A | 12/1981 | Summers et al. |
| 4,313,135 A | 1/1982 | Cooper |
| 4,347,527 A | 8/1982 | Lainez |
| 4,388,659 A | 6/1983 | Lemke |
| 4,408,309 A | 10/1983 | Kiesling et al. |
| 4,423,480 A | 12/1983 | Bauer et al. |
| 4,439,785 A | 3/1984 | Leonard |
| 4,506,348 A | 3/1985 | Miller et al. |
| 4,506,358 A | 3/1985 | Montgomery |
| 4,566,034 A | 1/1986 | Harger et al. |
| 4,602,297 A | 7/1986 | Reese |
| 4,633,331 A | 12/1986 | McGrady et al. |
| 4,665,431 A | 5/1987 | Cooper |
| 4,688,106 A | 8/1987 | Keller et al. |
| 4,689,022 A | 8/1987 | Peers et al. |
| 4,706,121 A | 11/1987 | Young |
| 4,723,181 A | 2/1988 | Hickok |
| 4,752,834 A | 6/1988 | Koombes |
| 4,755,889 A | 7/1988 | Schwartz |
| 4,760,442 A | 7/1988 | O'Connell et al. |
| 4,761,684 A | 8/1988 | Clark et al. |
| 4,789,961 A | 12/1988 | Tindall |
| 4,805,217 A | 2/1989 | Morihiro et al. |
| 4,816,905 A | 3/1989 | Tweedy et al. |
| 4,821,121 A | 4/1989 | Beaulier |
| 4,833,710 A | 5/1989 | Hirashima |
| 4,876,670 A | 10/1989 | Nakabayashi et al. |
| 4,891,715 A | 1/1990 | Levy |
| 4,897,867 A | 1/1990 | Foster et al. |
| 4,920,533 A | 4/1990 | Dufresne et al. |
| 4,924,387 A | 5/1990 | Jeppesen |
| 4,939,594 A | 7/1990 | Moxon et al. |
| 4,947,244 A | 8/1990 | Fenwick et al. |
| 4,949,169 A | 8/1990 | Lumelsky et al. |
| 4,949,187 A | 8/1990 | Cohen |
| 4,963,866 A | 10/1990 | Duncan |
| 4,963,995 A | 10/1990 | Lang |
| 4,972,396 A | 11/1990 | Rafner |
| 4,979,050 A | 12/1990 | Westland et al. |
| RE33,535 E | 2/1991 | Cooper |
| 4,991,033 A | 2/1991 | Takeshita |
| 5,001,568 A | 3/1991 | Efron et al. |
| 5,014,125 A | 5/1991 | Pocock et al. |
| 5,018,186 A | 5/1991 | Kimura et al. |
| 5,019,900 A | 5/1991 | Clark et al. |
| 5,021,893 A | 6/1991 | Scheffler |
| 5,027,241 A | 6/1991 | Hatch et al. |
| 5,027,400 A | 6/1991 | Baji et al. |
| 5,047,857 A | 9/1991 | Duffield et al. |
| 5,057,932 A | 10/1991 | Lang |
| 5,063,453 A | 11/1991 | Yoshimura et al. |
| 5,089,885 A | 2/1992 | Clark |
| 5,093,718 A | 3/1992 | Hoarty et al. |
| 5,109,281 A | 4/1992 | Koberi et al. |
| 5,118,105 A | 6/1992 | Brim et al. |
| 5,121,476 A | 6/1992 | Yee |
| 5,124,854 A | 6/1992 | Iyota et al. |
| 5,126,852 A | 6/1992 | Nishino et al. |
| 5,126,982 A | 6/1992 | Yifrach |
| 5,130,792 A | 7/1992 | Tindell et al. |
| 5,132,992 A | 7/1992 | Yurt et al. |
| 5,134,499 A | 7/1992 | Sata et al. |
| 5,142,532 A | 8/1992 | Adams |
| 5,153,726 A | 10/1992 | Billing |
| 5,155,663 A | 10/1992 | Harase |
| 5,168,353 A | 12/1992 | Walker et al. |
| 5,172,413 A | 12/1992 | Bradley et al. |
| 5,202,761 A | 4/1993 | Cooper |
| 5,208,665 A | 5/1993 | McCalley et al. |
| 5,214,768 A | 5/1993 | Martin et al. |
| 5,222,150 A | 6/1993 | Tajima |
| 5,226,141 A | 7/1993 | Esbensen |
| 5,227,876 A | 7/1993 | Cucchi et al. |
| 5,233,423 A | 8/1993 | Jernigan et al. |
| 5,233,603 A | 8/1993 | Takeuchi et al. |
| 5,237,648 A | 8/1993 | Mills et al. |
| 5,241,428 A | 8/1993 | Goldwasser et al. |
| 5,245,430 A | 9/1993 | Nishimura |
| 5,247,347 A | 9/1993 | Litteral et al. |
| 5,251,009 A | 10/1993 | Bruno |
| 5,253,275 A | 10/1993 | Yurt et al. |
| 5,283,659 A | 2/1994 | Akiyama et al. |
| 5,285,272 A | 2/1994 | Bradley et al. |
| 5,287,182 A | 2/1994 | Haskell |
| 5,311,423 A | 5/1994 | Clark |
| 5,317,556 A | 5/1994 | Tsuboi et al. |
| 5,317,603 A | 5/1994 | Osterweil |
| 5,317,604 A | 5/1994 | Osterweil |
| 5,329,307 A | 7/1994 | Takemura |
| 5,329,320 A | 7/1994 | Yifrach |
| 5,357,276 A | 10/1994 | Banker et al. |
| 5,361,261 A | 11/1994 | Edem et al. |
| 5,363,362 A | 11/1994 | Maeda et al. |
| 5,371,551 A | 12/1994 | Logan et al. |
| 5,377,051 A | 12/1994 | Lane et al. |
| 5,388,264 A | 2/1995 | Tobias, II et al. |
| 5,406,626 A | 4/1995 | Ryan |
| 5,412,416 A | 5/1995 | Nemirofsky |
| 5,414,455 A | 5/1995 | Hooper et al. |
| 5,428,731 A | 6/1995 | Powers, III |
| 5,438,423 A | 8/1995 | Lynch et al. |
| 5,440,334 A | 8/1995 | Walters et al. |
| 5,442,390 A | 8/1995 | Hooper et al. |
| 5,452,006 A | 9/1995 | Auld |
| 5,475,498 A | 12/1995 | Radice |
| 5,475,656 A | 12/1995 | Sato et al. |
| 5,477,263 A | 12/1995 | O'Callaghan et al. |
| 5,479,056 A | 12/1995 | Mabuchi |
| 5,481,542 A | 1/1996 | Logston et al. |
| 5,485,611 A | 1/1996 | Astle |
| 5,486,687 A | 1/1996 | Le Roux |
| 5,488,409 A | 1/1996 | Yuen et al. |
| 5,488,433 A | 1/1996 | Washino et al. |
| 5,497,244 A | 3/1996 | Chargin, Jr. et al. |
| 5,506,615 A | 4/1996 | Awaji |
| 5,506,902 A | 4/1996 | Kubota |
| 5,508,746 A | 4/1996 | Lim |
| 5,508,940 A | 4/1996 | Rossmere et al. |
| 5,510,858 A | 4/1996 | Shido et al. |
| 5,513,011 A | 4/1996 | Matsumoto et al. |
| 5,513,306 A | 4/1996 | Mills et al. |
| 5,519,684 A * | 5/1996 | Iizuka et al. .................... 369/93 |
| 5,521,630 A | 5/1996 | Chen et al. |
| 5,528,281 A | 6/1996 | Grady et al. |
| 5,528,282 A | 6/1996 | Voeten et al. |
| 5,535,008 A * | 7/1996 | Yamagishi et al. ........... 386/109 |
| 5,535,137 A | 7/1996 | Rossmere et al. |
| 5,537,157 A | 7/1996 | Washino |
| 5,546,250 A | 8/1996 | Diel |
| 5,550,594 A | 8/1996 | Cooper |
| 5,550,982 A | 8/1996 | Long et al. |
| 5,555,441 A | 9/1996 | Haddad |
| 5,555,463 A | 9/1996 | Staron |
| 5,557,724 A | 9/1996 | Sampat et al. |
| 5,559,999 A | 9/1996 | Maturi et al. |
| 5,563,714 A | 10/1996 | Inoue |
| 5,572,261 A | 11/1996 | Cooper |
| 5,572,442 A | 11/1996 | Schulhof et al. |
| 5,574,662 A | 11/1996 | Windrem et al. |
| 5,577,190 A | 11/1996 | Peters |
| 5,581,479 A | 12/1996 | McLaughlin et al. |
| 5,583,561 A | 12/1996 | Baker et al. |
| 5,583,652 A | 12/1996 | Ware |
| 5,584,043 A | 12/1996 | Burkart |
| 5,586,264 A | 12/1996 | Belknap et al. |
| 5,590,195 A | 12/1996 | Ryan |
| 5,596,581 A | 1/1997 | Saeijs et al. |

(56) References Cited

U.S. PATENT DOCUMENTS

| | | |
|---|---|---|
| 5,598,352 A | 1/1997 | Rosenau et al. |
| 5,600,364 A | 2/1997 | Hendricks et al. |
| 5,600,379 A | 2/1997 | Wagner |
| 5,603,058 A | 2/1997 | Belknap et al. |
| 5,604,544 A | 2/1997 | Bertram |
| 5,612,749 A | 3/1997 | Bacher et al. |
| 5,614,940 A | 3/1997 | Cobbley et al. |
| 5,615,401 A | 3/1997 | Harscoet et al. |
| 5,619,247 A | 4/1997 | Russo |
| 5,619,337 A | 4/1997 | Naimpally |
| 5,625,464 A | 4/1997 | Compoint et al. |
| 5,629,732 A | 5/1997 | Moskowitz et al. |
| 5,635,984 A | 6/1997 | Lee |
| 5,642,171 A | 6/1997 | Baumgartner |
| 5,648,824 A | 7/1997 | Dunn et al. |
| 5,659,539 A | 8/1997 | Porter et al. |
| 5,659,653 A | 8/1997 | Diehl et al. |
| 5,664,044 A | 9/1997 | Ware |
| 5,668,948 A | 9/1997 | Belknap et al. |
| 5,675,388 A | 10/1997 | Cooper |
| 5,677,979 A | 10/1997 | Squicciarini et al. |
| 5,696,866 A | 12/1997 | Iggulden et al. |
| 5,696,868 A | 12/1997 | Kim et al. |
| 5,701,383 A * | 12/1997 | Russo et al. ............ 386/46 |
| 5,703,655 A | 12/1997 | Corey et al. |
| 5,706,388 A | 1/1998 | Isaka |
| 5,712,976 A | 1/1998 | Falcon, Jr. et al. |
| 5,715,356 A | 2/1998 | Hirayama et al. |
| 5,719,982 A | 2/1998 | Kawamura et al. |
| 5,721,815 A | 2/1998 | Ottesen et al. |
| 5,721,878 A | 2/1998 | Ottensen et al. |
| 5,724,474 A | 3/1998 | Oguro et al. |
| 5,729,516 A | 3/1998 | Tozaki et al. |
| 5,729,741 A | 3/1998 | Liaguno et al. |
| 5,751,282 A | 5/1998 | Girard et al. |
| 5,751,338 A | 5/1998 | Ludwig et al. |
| 5,751,371 A | 5/1998 | Shintani |
| 5,751,806 A | 5/1998 | Ryan |
| 5,751,883 A | 5/1998 | Ottensen et al. |
| 5,754,254 A | 5/1998 | Kobayashi et al. |
| 5,761,166 A | 6/1998 | Sedlmayr et al. |
| 5,761,372 A | 6/1998 | Yoshinobu et al. |
| 5,761,417 A | 6/1998 | Henley et al. |
| 5,767,913 A | 6/1998 | Kassatly |
| 5,771,334 A | 6/1998 | Yamauchi et al. |
| 5,774,170 A | 6/1998 | Hite et al. |
| 5,774,186 A | 6/1998 | Brodsky et al. |
| 5,778,137 A | 7/1998 | Nielsen et al. |
| 5,787,225 A | 7/1998 | Honjo |
| 5,796,695 A | 8/1998 | Tsutsui |
| 5,805,763 A | 9/1998 | Lawler et al. |
| 5,805,804 A | 9/1998 | Laursen et al. |
| 5,805,821 A | 9/1998 | Saxena et al. |
| 5,808,607 A | 9/1998 | Brady et al. |
| 5,815,671 A | 9/1998 | Morrison |
| 5,815,689 A | 9/1998 | Shaw et al. |
| 5,822,493 A | 10/1998 | Uehara et al. |
| 5,828,848 A | 10/1998 | MacCormack et al. |
| 5,832,085 A | 11/1998 | Inoue et al. |
| 5,852,705 A | 12/1998 | Hanko et al. |
| 5,856,930 A | 1/1999 | Hosono |
| 5,862,342 A | 1/1999 | Winter et al. |
| 5,864,582 A | 1/1999 | Ander et al. |
| 5,864,682 A | 1/1999 | Porter et al. |
| 5,870,553 A | 2/1999 | Shaw et al. |
| 5,870,710 A | 2/1999 | Ozawa et al. |
| 5,889,915 A | 3/1999 | Hewton |
| 5,892,884 A | 4/1999 | Sugiyama et al. |
| 5,898,695 A | 4/1999 | Fujii et al. |
| 5,899,578 A | 5/1999 | Yanagihara et al. |
| 5,909,257 A | 6/1999 | Ohishi et al. |
| 5,911,030 A * | 6/1999 | Kikuchi et al. ............ 386/281 |
| 5,914,941 A | 6/1999 | Janky |
| 5,920,572 A | 7/1999 | Washington et al. |
| 5,920,842 A | 7/1999 | Cooper et al. |
| 5,928,347 A | 7/1999 | Jones |
| 5,929,849 A | 7/1999 | Kikinis |
| 5,930,444 A | 7/1999 | Camhi et al. |
| 5,937,138 A | 8/1999 | Fukuda et al. |
| 5,940,074 A | 8/1999 | Britt, Jr. et al. |
| 5,949,948 A | 9/1999 | Krause et al. |
| 5,949,954 A | 9/1999 | Young et al. |
| 5,956,716 A | 9/1999 | Kenner et al. |
| 5,963,202 A | 10/1999 | Polish |
| 5,973,679 A | 10/1999 | Abbott et al. |
| 5,990,881 A | 11/1999 | Inoue et al. |
| 5,991,496 A | 11/1999 | Kojima |
| 5,995,709 A | 11/1999 | Tsuge |
| 5,999,691 A * | 12/1999 | Takagi et al. ............ 386/46 |
| 5,999,698 A | 12/1999 | Nakai et al. |
| 6,002,832 A | 12/1999 | Yoneda |
| 6,005,562 A | 12/1999 | Shiga et al. |
| 6,005,564 A | 12/1999 | Ahmad et al. |
| 6,018,612 A | 1/2000 | Thomason et al. |
| 6,028,599 A | 2/2000 | Yuen et al. |
| 6,028,774 A | 2/2000 | Shin et al. |
| 6,094,234 A | 7/2000 | Nonomura et al. |
| RE36,801 E | 8/2000 | Logan et al. |
| 6,112,226 A | 8/2000 | Weaver et al. |
| 6,137,710 A | 10/2000 | Iwasaki et al. |
| 6,138,147 A | 10/2000 | Weaver et al. |
| 6,141,385 A | 10/2000 | Yamaji et al. |
| 6,151,059 A | 11/2000 | Schein et al. |
| 6,154,771 A | 11/2000 | Rangan et al. |
| 6,163,644 A | 12/2000 | Owashi et al. |
| 6,163,646 A | 12/2000 | Tanaka et al. |
| 6,167,083 A | 12/2000 | Sporer et al. |
| 6,169,843 B1 | 1/2001 | Lenihan et al. |
| 6,172,605 B1 | 1/2001 | Matsumoto et al. |
| 6,172,712 B1 | 1/2001 | Beard |
| 6,181,706 B1 | 1/2001 | Anderson et al. |
| 6,192,189 B1 | 2/2001 | Fujinami et al. |
| 6,198,877 B1 | 3/2001 | Kawamura et al. |
| 6,209,041 B1 | 3/2001 | Shaw et al. |
| 6,226,447 B1 | 5/2001 | Sasaki et al. |
| 6,229,532 B1 | 5/2001 | Fujii |
| 6,233,389 B1 | 5/2001 | Barton et al. |
| 6,243,741 B1 | 6/2001 | Utsumi |
| 6,249,641 B1 | 6/2001 | Yokota |
| 6,253,375 B1 | 6/2001 | Gordon et al. |
| 6,256,704 B1 | 7/2001 | Hlava et al. |
| 6,263,396 B1 | 7/2001 | Cottle et al. |
| 6,272,672 B1 | 8/2001 | Conway |
| 6,278,837 B1 | 8/2001 | Yasukohchi et al. |
| 6,282,209 B1 * | 8/2001 | Kataoka et al. ............ 370/498 |
| 6,282,320 B1 | 8/2001 | Hasegawa et al. |
| 6,285,407 B1 | 9/2001 | Yasuki et al. |
| 6,285,824 B1 | 9/2001 | Yanagihara et al. |
| 6,292,618 B1 | 9/2001 | Ohara et al. |
| 6,292,619 B1 | 9/2001 | Fujita et al. |
| 6,298,016 B1 | 10/2001 | Otsuka |
| 6,301,711 B1 | 10/2001 | Nusbickel |
| 6,304,714 B1 | 10/2001 | Krause et al. |
| 6,317,885 B1 | 11/2001 | Fries |
| 6,327,418 B1 | 12/2001 | Barton |
| 6,330,334 B1 | 12/2001 | Ryan |
| 6,330,675 B1 | 12/2001 | Wiser et al. |
| 6,332,175 B1 | 12/2001 | Birrell et al. |
| 6,341,195 B1 | 1/2002 | Mankovitz et al. |
| 6,343,179 B1 * | 1/2002 | Suito et al. ............ 386/241 |
| 6,349,410 B1 | 2/2002 | Lortz |
| 6,353,461 B1 | 3/2002 | Shore et al. |
| 6,356,708 B1 | 3/2002 | Krause et al. |
| 6,359,636 B1 | 3/2002 | Schindler et al. |
| 6,360,320 B1 | 3/2002 | Ishiguro et al. |
| 6,363,212 B1 | 3/2002 | Fujinami et al. |
| 6,400,407 B1 | 6/2002 | Zigmond et al. |
| 6,424,791 B1 | 7/2002 | Saib |
| 6,445,738 B1 | 9/2002 | Zdepski et al. |
| 6,445,872 B1 | 9/2002 | Sano et al. |
| RE37,881 E | 10/2002 | Haines |
| 6,477,123 B1 | 11/2002 | Hutter |
| 6,480,353 B1 | 11/2002 | Sacks et al. |
| 6,480,667 B1 * | 11/2002 | O'Connor ............ 386/83 |

(56) References Cited

U.S. PATENT DOCUMENTS

| | | |
|---|---|---|
| 6,490,000 B1 | 12/2002 | Schaefer et al. |
| 6,496,647 B2 | 12/2002 | Arai et al. |
| 6,496,981 B1 | 12/2002 | Wistendahl et al. |
| 6,498,894 B2 | 12/2002 | Ito et al. |
| 6,504,990 B1 | 1/2003 | Abecassis |
| 6,516,467 B1 | 2/2003 | Schindler |
| 6,529,685 B2 | 3/2003 | Ottesen et al. |
| 6,535,465 B1 | 3/2003 | Shigetomi et al. |
| 6,542,695 B1 | 4/2003 | Akiba et al. |
| 6,553,178 B2 | 4/2003 | Abecassis |
| 6,567,127 B1 | 5/2003 | Orr et al. |
| 6,694,200 B1 | 2/2004 | Naim |
| 6,697,944 B1 | 2/2004 | Jones et al. |
| 6,698,020 B1 | 2/2004 | Zigmond et al. |
| 6,704,493 B1 | 3/2004 | Matthews et al. |
| 6,708,251 B1 | 3/2004 | Boyle et al. |
| 6,748,539 B1 | 6/2004 | Lotspiech |
| 6,754,254 B2 | 6/2004 | Sendonaris |
| 6,757,165 B2 | 6/2004 | Fujiki et al. |
| 6,766,956 B1 | 7/2004 | Boylan et al. |
| 6,788,882 B1 | 9/2004 | Geer et al. |
| 6,829,254 B1 | 12/2004 | Rajahalme et al. |
| 6,865,431 B1 | 3/2005 | Hirota et al. |
| 6,895,169 B1 | 5/2005 | Sprague |
| 6,925,246 B1 | 8/2005 | Behl |
| 6,950,941 B1 | 9/2005 | Lee et al. |
| 6,959,221 B1 | 10/2005 | Kataoka |
| 6,985,584 B1 | 1/2006 | Yokota et al. |
| 6,993,567 B1 | 1/2006 | Yodo et al. |
| 7,032,177 B2 | 4/2006 | Novak et al. |
| 7,050,705 B1 | 5/2006 | Mori |
| 7,055,166 B1 | 5/2006 | Logan et al. |
| 7,137,011 B1 | 11/2006 | Harari et al. |
| 7,239,800 B2 | 7/2007 | Bilbrey |
| 7,266,704 B2 | 9/2007 | Levy |
| 7,272,298 B1 | 9/2007 | Lang et al. |
| 7,346,582 B2 | 3/2008 | Sako et al. |
| 7,607,157 B1 | 10/2009 | Inoue et al. |
| 7,877,765 B2 | 1/2011 | Bhogal et al. |
| 8,046,803 B1 | 10/2011 | Lee |
| 2001/0003554 A1 | 6/2001 | Mori et al. |
| 2001/0013120 A1 | 8/2001 | Tsukamoto |
| 2002/0003949 A1 | 1/2002 | Mamiya et al. |
| 2002/0012531 A1 | 1/2002 | Flannery |
| 2002/0017558 A1 | 2/2002 | Graves |
| 2002/0028063 A1 | 3/2002 | Haneda et al. |
| 2002/0056118 A1 | 5/2002 | Hunter et al. |
| 2002/0057895 A1 | 5/2002 | Oku et al. |
| 2002/0144265 A1 | 10/2002 | Connelly |
| 2002/0164156 A1 | 11/2002 | Bilbrey |
| 2002/0176690 A1 | 11/2002 | Nagasawa |
| 2002/0199043 A1 | 12/2002 | Yin |
| 2003/0026589 A1 | 2/2003 | Barton et al. |
| 2003/0040962 A1 | 2/2003 | Lewis |
| 2003/0118014 A1 | 6/2003 | Ravishankar et al. |
| 2003/0120942 A1 | 6/2003 | Yoshida et al. |
| 2003/0215211 A1 | 11/2003 | Coffin, III |
| 2004/0117483 A1 | 6/2004 | Singer et al. |
| 2004/0193900 A1 | 9/2004 | Nair |
| 2005/0025469 A1 | 2/2005 | Geer et al. |
| 2005/0066362 A1 | 3/2005 | Rambo |
| 2005/0122335 A1 | 6/2005 | MacInnis et al. |
| 2005/0132418 A1 | 6/2005 | Barton et al. |
| 2005/0226604 A1 | 10/2005 | Kawamura et al. |
| 2006/0045470 A1 | 3/2006 | Poslinski et al. |
| 2007/0157237 A1 | 7/2007 | Cordray et al. |
| 2007/0230921 A1 | 10/2007 | Barton et al. |
| 2008/0092168 A1 | 4/2008 | Logan et al. |
| 2008/0288998 A1 | 11/2008 | Locket |
| 2009/0136215 A1 | 5/2009 | Barton et al. |
| 2009/0208185 A1 | 8/2009 | Barton |
| 2009/0269024 A1 | 10/2009 | Locket et al. |
| 2010/0080529 A1 | 4/2010 | Barton et al. |
| 2010/0226627 A1 | 9/2010 | Barton et al. |
| 2011/0041146 A1* | 2/2011 | Lewis ................. 725/5 |
| 2011/0126107 A1 | 5/2011 | Barton et al. |

FOREIGN PATENT DOCUMENTS

| | | |
|---|---|---|
| CN | 1189045 | 7/1998 |
| DE | 3909334 A1 | 9/1990 |
| DE | 4201 031 C2 | 7/1993 |
| DE | 44 34 034 A1 | 3/1996 |
| EP | 0594241 A1 | 10/1993 |
| EP | 0594241 B1 | 4/1994 |
| EP | 0 651 328 A1 | 5/1995 |
| EP | 0701371 A1 | 3/1996 |
| EP | 0726574 A2 | 8/1996 |
| EP | 0726574 A2 | 8/1996 |
| EP | 0766476 A2 | 9/1996 |
| EP | 0762756 A2 | 3/1997 |
| EP | 784400 | 7/1997 |
| EP | 0785675 A2 | 7/1997 |
| EP | 0817483 A2 | 1/1998 |
| EP | 0817483 A2 | 7/1998 |
| GB | 2222742 A | 8/1989 |
| GB | 2 286 282 A | 8/1995 |
| GB | 2320637 | 6/1998 |
| GB | 2333017 | 7/1999 |
| JP | 61-133089 | 6/1986 |
| JP | 02-266774 | 10/1990 |
| JP | 3- 34685 | 2/1991 |
| JP | 03-34685 | 2/1991 |
| JP | 04088772 | 3/1992 |
| JP | 5-181803 | 7/1993 |
| JP | 06233234 | 8/1994 |
| JP | 06245157 | 9/1994 |
| JP | H6-245182 | 9/1994 |
| JP | 07264529 | 1/1995 |
| JP | H7-30839 | 1/1995 |
| JP | 7-44907 | 2/1995 |
| JP | H7-44907 | 2/1995 |
| JP | 07111629 | 4/1995 |
| JP | 07131754 | 5/1995 |
| JP | 07250305 | 9/1995 |
| JP | 8-279273 | 10/1996 |
| JP | H8-289240 | 11/1996 |
| JP | 09233415 | 5/1997 |
| JP | 10-56620 | 2/1998 |
| JP | 11-203135 | 7/1999 |
| JP | 2000-295560 | 10/2000 |
| WO | WO 91/03112 A1 | 8/1990 |
| WO | 92/04573 | 6/1992 |
| WO | WO 92/22983 | 6/1992 |
| WO | WO 92/22983 * | 12/1992 ............. H04N 5/781 |
| WO | WO 92/22983 A2 | 12/1992 |
| WO | WO 93/16557 A1 | 8/1993 |
| WO | WO 94/17626 | 8/1994 |
| WO | WO 95/33336 | 12/1995 |
| WO | WO 97/15143 | 4/1997 |
| WO | WO 98/48566 | 10/1998 |
| WO | WO 98/56188 A2 | 12/1998 |
| WO | WO 99/38321 | 7/1999 |
| WO | WO 00/76130 A1 | 5/2000 |
| WO | WO 00/33568 A1 | 6/2000 |
| WO | 01/48755 | 7/2001 |
| WO | WO 01/48755 | 7/2001 |
| WO | WO 01/53963 | 7/2001 |
| WO | WO 03/019932 | 3/2003 |

OTHER PUBLICATIONS

Official Action from EPO for foreign patent application No. 99 909 867.6-2202 dated Dec. 27, 2005 (5 pgs)—attached.

Current Claims in EPO patent application No. 99 909 867.6-2202 (9 pgs)—attached.

Inside MacIntosh "QuickTime", Apple Technology Library by Apple Computer, Inc., © 1993 (published by Addison-Wesley Publishing Company) 719 pgs.

Inside MacIntosh "Files", Apple Technology Library by Apple Computer, Inc., © 1992 (published by Addison-Wesley Publishing Company) 532 pgs.

(56) References Cited

OTHER PUBLICATIONS

Inside MacIntosh "Memory", Apple Technology Library by Apple Computer, Inc., © 1992 (published by Addison-Wesley Publishing Company) 303 pgs.
Inside MacIntosh "QuickTime Components", Apple Technology Library by Apple Computer, Inc., © 1993 (published by Addison-Wesley Publishing Company) 828 pgs.
Inside MacIntosh "Overview", Apple Technology Library by Apple Computer, Inc., © 1992 (published by Addison-Wesley Publishing Company) 251 pgs.
Quantum Q500 Series High Capacity 5 1/4 Fixed Disk Drive, Quantum Corporation, © 1983 (2 pgs).
Quantum 2000 Series Low-Cost 8' Fixed Disk Drives, "New DC Motor Option", Quantum Corporation (2 pgs).
Quantum Q2080 Low-Cost, 85 Megabyte Fixed Disk Drive, "85 Mb capacity/40ms average access time", Quantum Corporation, © 1982 (2 pgs).
OEM Interface Specifications for DSAA-3xxx, 3.5-Inch Hard Disk Drive with ATA Interface, IBM Corporation, © 1994 (65 pgs).
International Standard ISO/IEC 11172-2:1993(E), (Part 2: Video), Downloaded Jun. 15, 2005 (136 pgs).
International Standard ISO/IEC 11171-3:1993/Cor.1:1996(E), (Part 3: Audio), Downloaded Jun. 15, 2005 (159 pgs).
Hewlett Packard® MPEGscope User's Guide, Hewlett Packard Company © 1997-2000 (282 pgs).
DiviCom, MP100 User Guide, DiviCom, Inc., © 1996 (97 pgs).
Hewlett Packard® MPEGscope Startup Guide, Hewlett Packard Company C 1997-2000 (39 pgs).
MediaStream by Media4, "Desktop Satellite Multimedia", "The MediaStream Receiver Card", "MediaStream Uplink System", by Media4, Inc. (2 pgs).
Jim Stratigos et al., Media4 Press Release "Announces Reseller Agreement with AlphaStar Television Networks", Microsoft® and Windows® 95 (3 pgs).
Jim Stratigos et al., Media4 Press Release "Announces Multimedia Satellite Network for Personal Computers", Microsoft® and Windows® 95 (3 pgs).
Media Stream, "Satellite Receiver" Installation and Users Guide for Windows 95, Media4, Inc., © 1996 (33 pgs).
International Standard ISO/IEC 13818-1:2000(E) "Information Technology—Generic Coding of Moving Pictures and Associated Audio Information: Systems", © ISO/IEC 2000, Downloaded Jun. 30, 2005 (173 pgs).
International Standard ISO/IEC 13818-1:2000/Amd.2:2004(E) "Information Technology—Generic Coding of Moving Pictures and Associated Audio Information: Systems", Amendment 2: Support of IPMP on MPEG-2 Systems, © ISO/IEC 2004, Downloaded Jun. 30, 2005 (13 pgs).
International Standard ISO/IEC 13818-2:2000(E) "Information Technology—Generic Coding of Moving Pictures and Associated Audio Information: Video", © ISO/IEC 2000, Downloaded Jun. 30, 2005 (219 pgs).
International Standard ISO/IEC 13818-3:1998(E) "Information Technology—Generic Coding of Moving Pictures and Associated Audio Information: Audio", © ISO/IEC 1998 (125 pgs).
Guide to VAX/VMS File Applications Software Version VAX/VMS Version 4.0, Sep. 1984 (19 pgs).
Harrick M. Vin, et al., *Designing a Multiuser HDTV Storage Server*, IEEE Journal, vol. 11, No. 1, Jan. 1993 (pp. 153-164).
Quantum Fireball 640/1280S Product Manual, Quantum®, Copyright © 1995 by Quantum Corporation (190 pgs).
Winston Hodge, et al., "Chapter 7, True Video on Demand vs. Near Video on Demand", delivered at National Cable Television Conference, May 24, 1994 (pp. 103-120).
Cyril U. Orji, et al., "*Design and Configuration Rationales for Digital Video Storage and Delivery Systems*", Multimedia Tools and Applications, 9, 275-302 (1992), © 1992 Kluwer Academic Publishers, Boston (pp. 275-302).
SCSI Specification, 0663 and 0663 Enhanced Disk Drive, Release 4.0, (247 pgs).

R. Johnston, et al., "*A Digital Television Sequence Store*", IEEE, (pp. 594-600) © 1978.
M. Hausdorfer, "*Symposium Record Broadcast Sessions*", HDTV Production: Today and Tomorrow, Jun. 17, 1989, (7 pgs).
S. Berson, "*Computer Science Department Technical Report*", Staggered Striping in Multimedia Information System, Dec. 1993, Apr. 29, 1994, (24 pgs).
S. Berson, et al., "Design of a Scalable Multimedia Storage Manager", (pp. 1-30).
Conner Filepro Performance Series, CFP1060E/CFP1060S/CFP1060W, "*Intelligent Disk Drive Product Manual*", Rev. A, May 1994, © 1994, Conner Peripherals, Inc., (79 pgs).
Hugh M. Sierra, "*An Introduction to Direct Access Storage Devices*", © 1990 by Academic Press, Inc., (269 pgs).
I. Freedman, et al., "*Systems Aspects of COBE Science Data Compression*", Cosmology Data Analysis Center, (pp. 85-97).
Douglas T. Anderson, "*The Hard Disk Technical Guide*", Tenth Revision S-D., Feb. 1994, © 1990, 1991, 1992, 1993, 1994 by Micro House International Inc., (70 pgs).
Official Action from CN for foreign patent application No. 02816471.1 dated Oct. 21, 2005 (5 pgs)—attached.
Current Claims in CN patent application No. 02816471.7 (10 pgs)—attached.
International Standard ISO/IEC 11172 (MPEG-1 Standard, Part 1: Systems).
K. Shen et al., *A Fast Algorithm for Video Parsing Using MPEG Compressed Sequences*, IEEE, pp. 252-255 (0-8185-7310-9/626/1995).
S. Smollar et al., Content-based Video Indexing and Retrieval, IEEE, Summer 1994, pp. 62-72.
J. Meng et al., *CVEPS-A Compressed Video Editing and Parsing System*, ACM Multimedia '96, Boston MA, pp. 43-53 (ACM 0-89791-671-1/96/1).
Current Claims in EPO patent application No. 99 909 867.6-2002 (__ pgs)—attached.
Office Action from CN for foreign patent application No. 200410056388.3 dated Nov. 25, 2005 (15 pgs)—attached.
Current Claims in CN patent application No. 200410056388.3 (9 pgs)—attached.
European Patent Office, "Communication pursuant to Article 94(3) EPC", Foreign application No. 02 796 373.5-1522, received Jan. 25, 2008, 6 pages.
Claims, Foreign application No. 02 796 373.5-1522, 5 pages.
Ex Parte Reexamination Certificate, U.S. Patent No. 6,233,389, C1, issued Nov. 11, 2008.
Order Granting Request for Ex Parte Reexamination, U.S. Patent No. 6,233,389, U.S. Appl. No. 90/009,329, mailed Jan. 7, 2009.
Peuker, Thomas, "An Object-Oriented Architecture for the Real-Time Transmission of Multimedia Data Streams", Institute für Mathematische Maschinen und Datenverarbeitung (Informatik) IV, Lehrstul für Betriebssyteme Universität Erlangen-Nürnberg, Erlangen, Mar. 17, 1997.
Mayer-Patel, Ketan et al., "Synchronized Continuous Media Playback Through the World Wide Web", U.C. Berkeley, Computer Science Division, Berkeley Multimedia Research Center, Published:1996, Berkeley, CA.
Chatterjee, Amit et al., "Microsoft DirectShow: A New Media Architecture", SMPTE Journal, pp. 865-871, Dec. 1997.
Fung, Chi-Leung et al., "MOCS: an Object-Oriented Programming Model for Multimedia Object Communication and Synchronization", Department of Computer Science, The Hong Kong University of Science and Technology, Clear Water Bay, Kowloon, Hong Kong, 1994 IEEE.
Gibbs, Simon, "Composite Multimedia and Active Objects", Centre Universitaire d'Informatique, Universiteé de Genève, Proc. OOPSLA '91.
European Patent Office, Communication dated Feb. 5, 2009, in European Patent Application No. 1 729 515, Notice of Opposition, Brunner/Williamson opponents.
European Patent Office, Notice of Opposition, European Application No. EP 1 729 515, Interressensgemeinschaft fur Rundfunkschutzrechte e.V., opponent, dated Jan. 23, 2009.

(56) References Cited

OTHER PUBLICATIONS

U.S. District Court for the Eastern District of Texas, Marshall Division, Claim Construction Order, *Tivo Inc.* v. *Echostar Communications Corp. et al.*, Case No. 2:04-CV-1-DF, Aug. 18, 2005.
U.S. District Court for the Eastern District of Texas, Marshall Division, Final Judgment and Permanent Injunction, *Tivo Inc.* v. *Echostar Communications Corp. et al.*, Case No. 2:04-CV-1-DF, Aug. 17, 2006.
U.S. Court of Appeals for the Federal Circuit, *TiVo Inc.* v. *Echostar Communications Corp. et al.*, Decision, Case No. 2006-1574, Decided: Jan. 31, 2008.
"New Graphics Enhancements Will Be on Display at NAB (National Association of Broadcasters) Exhibition", Broadcasting v118, n11, p57, Mar. 12, 1990.
"Next Video Recorder—Tape or Disc?", Consumer Electronics, v33, n8, Feb. 22, 1993.
McLarnon, Zed et al., "Digital Image Meets Digital Audio; Sync Problems Faced by Multimedia Producer Now", Advanced Imaging, v9, n1, p62, Jan. 1994.
Nelson, Lee J. "The Latest in Compression Hardware & Software (Product Survey)", Advanced Imaging, v9, n1, p56, Jan. 1995.
Leek, Matthew R., et al., "MPEG Q&A (Moving Pictures Expert Group Digital Video Compression Standard")", CD-ROM Professional, v7, n4, p41, Jul.-Aug. 1994.
Ceccarelli, M et al., "A sequence analysis system for video databases," Time-Varying Image Processing and Moving Object Recognition 4, Elsevier Science B.V., pp. 133-138, 1997.
Hanjalic et al., "Automation of systems enabling search on stored video data," SPIE/IS&T Electronic Imaging '97, vol. 3022, pp. 427-438, Jan. 15, 1997.
DMA, published in Embedded Systems Programming, 4 pages, Oct. 1994.
European Patent Office, Application No. 07025136.8-1522, Office Action dated Mar. 30, 2009.
European Patent Office, Application No. 07025136.8-1522, current claims as of Mar. 30, 2009.
Decision on Petition of Patent Owner to Temporarily Suspend Ex Parte Reexamination Proceeding, U.S. Patent No. 6,233,389, Control No. 90/009,329, mailed Sep. 14, 2009.
Non-final Office Action in Reexamination Proceeding, U.S. Patent No. 6,233,389, Control No. 90/009,329, mailed Aug. 3, 2009.
Decision on Petition of Patent Owner to Temporarily Suspend Ex Parte Reexamination Proceeding, U.S. Patent No. 6,233,389, Control No. 90/009,329, mailed Aug. 21, 2009.
U.S. District Court for the Eastern District of Texas, Marshall Division, Complaint for Patent Infringement and Jury Demand, *Tivo Inc.* v. *AT&T Inc.*, Case No. 2:09-cv-259, Aug. 26, 2009.
U.S. District Court for the Eastern District of Texas, Marshall Division, Complaint for Patent Infringement and Jury Demand, *Tivo Inc.* v. *Verizon Communications, Inc.*, Case No. 2:09-cv-257, Aug. 26, 2009.
Astarte DVDirector Beta Testing Program.
H. Zhang et al., Video parsing, retrieval and browsing: an integrated and content-based solution, ACM Multimedia 95-Electronic Proceedings (Nov. 5-9, 1995, San Francisco, CA.
Ramanathan et al., "Toward personalized multimedia dial-up services," Computer Networks and ISDN Systems Jul. 26, 1994, No. 10, Amsterdam NL.
Fuji et al., "Implementation of MPEG Transport Demultiplexer with a RISC-Based Microcontroller", IEEE, 1996.
Macweek News article entitled "Quick Time Ready for Prime Time", dated Dec. 10, 1991 (2 pages).
Hewlett Packard Laboratories Technical Report entitled "UNIX Disk Access Patterns", by Chris Ruemmler and John Wildes, HPL-92-152, dated Dec. 1992 (pgs, 405-420), Hewlett-Packard Company, 1992.
J.M.Harker et al., "A Quarter Century of Disk File Innovation," IBM J. Res. Develop., vol. 25, No. 5, Sep. 1981, Pp. 677-690.
A.D. Hospodor, "The Effect of Prefetch in SCSA Disk Drive Cache Buffers," Doctoral Thesis, Santa Clara University, May 2, 1994.

D.J. Woodham, "HDTV Production: Today and Tomorrow: A Solid State "Action Relay" Recorder", Symposium Record Broadcast Sessions, System Session P-2, dated Jun. 17, 1989 (8 pgs.).
Japanese Application 2003524253, Office Action dated Oct. 19, 2005.
European Application No. 06019602.9, Office Action dated Jan. 10, 2007.
European Application No. 06019602.9, Search Report dated Nov. 6, 2006.
U.S. District Court for the Eastern District of Texas, Marshall Division, Amended Final Judgment and Permanent Injunction, *Tivo Inc.* v. *Echostar Communications Corp. et al.*, Case No. 2:04-CV-1-DF, Jun. 2, 2009.
U.S. District Court for the Eastern District of Texas, Marshall Division, Memorandum Opinion, *Tivo Inc.* v. *Echostar Communications Corp. et al.*, Case No. 2:04-CV-1-DF, Jun. 2, 2009.
Petition of Patent Owner to Vacate Order Granting Second Reexamination Request, U.S. Patent No. 6,233,389, Control No. 90/009,329, filed May 27, 2009.
Petition of Patent Owner to Temporarily Suspend *Ex Parte* Reexamination Proceeding, U.S. Patent No. 6,233,389, Control No. 90/009,329, filed May 27, 2009.
Chinese Application No. 200410056388.3, Office Action dated Nov. 25, 2005.
Intellectual Property Library, "*Sitrick* vs. *Dreamworks LLC*", (CAFC) 85 USPQ2d, 1826, revised Feb. 5, 2008, 9 pages.
Exhibit A11 to AT&T's and Microsoft Corporation's Invalidity Contentions: Claim Chart of U.S. Patent No. 6,233,389 in view of U.S. Patent No. 5,557,724 to Sampat, 23 pages.
Exhibit A2 to AT&T's and Microsoft Corporation's Invalidity Contentions: Claim Chart of U.S. Patent No. 6,233,389 in view of U.S. Patent No. 6,169,843, 6 pages.
Exhibit A3 to AT&T's and Microsoft Corporation's Invalidity Contentions: Claim Chart of U.S. Patent No. 6,233,389 in view of U.S. Patent No. 6,181,706, 5 pages.
Exhibit A4 to AT&T's and Microsoft Corporation's Invalidity Contentions: Claim Chart of U.S. Patent No. 6,233,389 in view of U.S. Patent No. 7,272,298 to Lang, 11 pages.
Exhibit As to AT&T's and Microsoft Corporation's Invalidity Contentions: Claim Chart of U.S. Patent No. 6,233,389 in view of U.S. Patent No. 6,209,041, 140 pages.
Exhibit A6 to AT&T's and Microsoft Corporation's Invalidity Contentions: Claim Chart of U.S. Patent No. 6,233,389 in view of U.S. Patent No. 6,172,712, 137 pages.
Exhibit A7 to AT&T's and Microsoft Corporation's Invalidity Contentions: Claim Chart of U.S. Patent No. 6,233,389 in view of Graham Thomason, EP0594241, 136 pages.
Exhibit A8 to AT&T's and Microsoft Corporation's Invalidity Contentions: Claim Chart of U.S. Patent No. 6,233,389 in view of U.S. Patent No. 5,822,493, 161 pages.
Exhibit A9 to AT&T's and Microsoft Corporation's Invalidity Contentions: Claim Chart of U.S. Patent No. 6,233,389 in view of U.S. Patent No. 6,490,000, 134 pages.
Exhibit A10 to AT&T's and Microsoft Corporation's Invalidity Contentions: Claim Chart of U.S. Patent No. 6,233,389 in view of C. Hanna et al., Demultiplexer IC for MPEG2 Transport Streams, 138 pages.
Exhibit A11 to AT&T's and Microsoft Corporation's Invalidity Contentions: Claim Chart of U.S. Patent No. 6,233,389 in view of Robert Johnson, A Digital Television Sequence Store, 148 pages.
Exhibit A12 to AT&T's and Microsoft Corporation's Invalidity Contentions: Claim Chart of U.S. Patent No. 6,233,389 in view of U.S. Patent No. 5,721,815 to Ottesen, 18 pages.
Exhibit A13 to AT&T's and Microsoft Corporation's Invalidity Contentions: Claim Chart of U.S. Patent No. 6,233,389 in view of U.S. Patent No. 6,018,612 to Thomason, et al. and further in view of U.S. Patent No. 5,949,948 to Krause et al., 7 pages.
Exhibit A14 to AT&T's and Microsoft Corporation's Invalidity Contentions: Claim Chart of U.S. Patent No. 6,233,389 in view of U.S. Patent No. 6,018612, and further in view of U.S. Patent No. 5,477,263 and U.S. Patent No. 6,169,843, 11 pages.

(56) References Cited

OTHER PUBLICATIONS

Exhibit A15 to AT&T's and Microsoft Corporation's Invalidity Contentions: Claim Chart of U.S. Patent No. 6,233,389 in view of "StreamObjects: Dynamically-Segmented Scalable Media Over the Internet" by Steven Niemczyk, 17 pages.
Exhibit A16 to AT&T's and Microsoft Corporation's Invalidity Contentions: Claim Chart of U.S. Patent No. 6,233,389 in view of "A Programming System for the Dynamic Manipulation of Temporally Sensitive Data" by Christopher J. Lindblad, 16 pages.
Exhibit A17 to AT&T's and Microsoft Corporation's Invalidity Contentions: Claim Chart of U.S. Patent No. 6,233,389 in view of "An Architecture for Networked Multimedia" by Jonathan C. Soo, 12 pages.
Exhibit A18 to AT&T's and Microsoft Corporation's Invalidity Contentions: Claim Chart of U.S. Patent No. 6,233,389 in view of "Design of a Storage and Retrieval Model for Multimedia Data" by Ruihong Wang, 11 pages.
Exhibit A19 to AT&T's and Microsoft Corporation's Invalidity Contentions: Claim Chart of U.S. Patent No. 6,233,389 in view of U.S. Patent No. 6,304,714 to Krause et al., 7 pages.
Exhibit A20 to AT&T's and Microsoft Corporation's Invalidity Contentions: Claim Chart of U.S. Patent No. 6,233,389 in view of U.S. Patent No. 5,990,881, 6 pages.
Exhibit A21 to AT&T's and Microsoft Corporation's Invalidity Contentions: Claim Chart of U.S. Patent No. 6,233,389 in view of U.S. Patent No. 5,898,695, 6 pages.
Exhibit A22 to AT&T's and Microsoft Corporation's Invalidity Contentions: Claim Chart of U.S. Patent No. 6,233,389 in view of "Developing Object-Oriented Multimedia Software" by Phillip Ackermann, 9 pages.
Exhibit A23 to AT&T's and Microsoft Corporation's Invalidity Contentions: Claim Chart of U.S. Patent No. 6,233,389 in view of U.S. DISHplayer 7100 System and U.S. Patent No. 6,490,000, 21 pages.
U.S. District Court for the Eastern District of Texas, Marshall Division, AT&T's and Microsoft Corporation's Invalidity Contentions, *TiVo Inc.* vs. *AT&Inc. and Microsoft Corporation*, Case No. 2:09-CV-259-DF, 44 pages, May 21, 2010.
Ash, Robert "Real-Time Encoding and Feeds in Oracle Video Server" an Oracle white paper, Mar. 1998, 7 pages.
Dowden, John et al. "Oracle Video Server: Getting Started with Oracle Video Server Manager" release 3.0, Feb. 1998, part No. A55979-02, 48 pages.
Hanna, C. et al. "Demultiplexer IC for MPEG2 Transport Streams" IEEE Transactions on Consumer Electronics, vol. 41, No. 3, Aug. 1995, pp. 699-706.
Kurioka, Tatsuya et al. "Television Homer Server for Integrated Services—Toward the Realization of ISDB 'Anytime' Services-" NHK Science and Technical Research Laboratories, Tokyo, Japan, Proceedings ISCE '97, IEEE International Symposium on consumer Electronics, pp. 250-253.
Lindblad, Christopher "A Programming System for the Dynamic Manipulation of Temporally Sensitive Data" MIT Laboratory for Computer Science, Aug. 1994, 275 pages.
Linden, Brian et al. "Oracle Video Server™: Introducing Oracle Video Server" release 3.0, Feb. 1998, part No. A53956-02, 78 pages.
McKendrick, Martin "Adding Video to Applications with the Oracle Video Server" an Oracle White Paper, Mar. 1998, 30 pages.
Minneman, Scott L. et al. "Where Were We: making and using near-synchronous, pre-narrative video" International Multimedia Conference, Proceedings of the first ACM International Conference on Multimedia 1993, pp. 207-214, (9 pages).
Niemczyk, Steven "StreamObjects: Dynamically-Segmented Scalable Media Over the Internet" submitted to the Department of Electrical Engineering and Computer Science, Massachusetts Institute of Technology, May 27, 1996, 90 pages.
Oracle Corporation "Video-Enhanced Web Services: Delivering Interactive Television and Switched Video Broadcast Services" an Oracle, Digital, Ericsson and Acorn White Paper, Mar. 1998, 11 pages.

Soo, Jonathan C. "An Architecture for Networked Multimedia" submitted to the Department of Electrical Engineering and Computer Science, Massachusetts Institute of Technology, May 30, 1995, 49 pages.
Tektronix PDR 100 Profile™ Video Disk Recorder 070-9042-02, User Manual, First printing: Feb. 1995, Revised: Aug. 1995, 156 pages.
Wang, Ruihong "Design of a Storage and Retrieval Model for Multimedia Data" Thesis, submitted to the School of Graduate Studies and Research, Ottawa-Carleton Institute of Electrical Engineering, 1994, 116 pages.
Oracle Corporation "Oracle Video Server™: Installation Guide" Release 3.0 for Sun SPARC Solaris 2.x, Feb. 1998, part no. A59554-01, 82 pages.
Dowden, John et al. Oracle Video Server™: Quick Start, Release 3.0, Feb. 1998, part No. A53954-02, 28 pages.
Oracle Corporation "Oracle Video Server™: Release Notes" Realease 3.0.4 for Sun SPARC Solaris 2.x. May 1998, part No. A53951-03, 34 pages.
Rosen, Daryl "Oracle Video Server System Technical Overview" An Oracle White Paper, Mar. 1998, 15 pages.
Engst, Adam "Quick Time" article originally appeared in TidBITS on Jul. 22, 1991 at 12:00 p.m., the permanent URL for the article is: http://db.tidbits.com/article/3441, 5 pages.
Brophy, Karen A. "SuperMac's JPEG-based DigitalFilm card could change the multimedia game" article from INFOWORLD, Aug. 9, 1993, p. 68.
Pugh, Jon "VideoSpigot Review" article originally appeared in TidBITS on Apr. 20, 1992 at 12:00 p. m., the permanent URL for the article is: http://db.tidbits.com/article/3120, 3 pages.
Computergram "WebTV Networks Promises TV-Quality Video with VideoFlash", Jan. 20, 1997, article from www.cbronline.com, 1 page.
Coale, Kristi "WebTV Plus Raises the Stakes" Sep. 16, 1997, article URL is http://www.wired.com/print/science/discoveries/news/1997/09/6914, 2 pages.
Phillip Ackermann, excerpts including: the cover, pp. 66-69 and pp. 190-193 from the book entitled "Developing Object-Oriented Multimedia Software" copyright 1996 by dpunkt, 5 pages.
Loronix CCTVware Enterprise Product Brochure, 2 pages.
Loronix CCTVware Solo Product Brochure, 2 pages.
U.S. District Court for the Eastern District of Texas, Marshall Division, Tivo's and Verizon Communications Inc., Verizon Service Corp. and Verizon Corporation Resources Group LLC Invalidity Contentions, *TiVo Inc.* vs. *Verizon Communications Inc.* Case No. 2:09-CV-257DF, 44 pages.
European Patent Office, "Office Action", Application Number: 07 021 583.5 -1241, Applicant: Tivo Inc., Dated May 2, 2011, 4 pages.
Claims, Application Number: 07 021 583.5-1241, Applicant: Tivo Inc., Dated May 2011, 2 pages.
Office Action received in European application No. 11182065.0 dated Dec. 16, 2011 (9 pages).
Current Claims of European application No. 11182065.0 dated Dec. 2011 (3 pages).
European Patent Office, Action received in European application No. 07025136.8-1522 dated Nov. 18, 2011, 5 pages.
Current Claims in Application No. 07025136.8-1522, dated Nov. 2011, 4 pages.
Australian Government, "Patent Examination Report No. 1", in application No. 20100202449, dated Jun. 28, 2012, 3 pages.
Current Claims application No. 20100202449, dated Jun. 2012, 3 pages.
Chinese Office Action received in Application No. 200580041645.9 dated Nov. 24, 2011 (9 pages).
Current Claims of Chinese Application No. 200580041645.9 dated Nov. 2011 (11 pages).
U.S. Appl. No. 12/572,023, filed Oct. 1, 2009, Notice of Allowance, mailed Apr. 11, 2013.
U.S. Appl. No. 12/783,298, filed May 19, 2010, Final Office Action, mailed Apr. 4, 2013.
U.S. Appl. No. 12/270,852, filed Nov. 13, 2008, Office Action, mailed Feb. 27, 2013.
U.S. Appl. No. 12/430,024, filed Apr. 24, 2009, Final Office Action, mailed Dec. 31, 2012.

(56) References Cited

OTHER PUBLICATIONS

U.S. Appl. No. 12/257,352, filed Oct. 23, 2008, Non-Final Office Action, May 10, 2011.
U.S. Appl. No. 10/190,256, filed Jul. 5, 2002, Notice of Publication, mailed Feb. 6, 2003.
U.S. Appl. No. 10/190,256, filed Jul. 5, 2002, Non-Final Office Action, mailed Oct. 6, 2008.
U.S. Appl. No. 10/190,256, filed Jul. 5, 2002, Non-Final Office Action, mailed Nov. 9, 2010.
U.S. Appl. No. 10/190,256, filed Jul. 5, 2002, Non-Final Office Action, mailed Jul. 8, 2011.

\* cited by examiner

DIGITAL VIDEO RECORDING SYSTEM

CROSS REFERENCE TO RELATED APPLICATIONS

This application is a Continuation-in-part of U.S. patent application Ser. No. 09/827,029, filed on 5 Apr. 2001 which is a continuation of U.S. Pat. No. 6,233,389 filed on 30 Jul. 1998; this application further claims benefit of U.S. Provisional Patent Application Ser. No. 60/374,101, filed on 19 Apr. 2002.

BACKGROUND OF THE INVENTION

1. Technical Field

The invention relates to the time shifting of television broadcast signals. More particularly, the invention relates to the real time capture, storage, and display of television broadcast signals and the transfer and playback of said television broadcast signals from a DVD player/recorder.

2. Description of the Prior Art

The Video Cassette Recorder (VCR) has changed the lives of television (TV) viewers throughout the world. The VCR has offered viewers the flexibility to time shift TV programs to match their lifestyles.

The viewer stores TV programs onto magnetic tape using the VCR. The VCR gives the viewer the ability to play, rewind, fast forward and pause the stored program material. These functions enable the viewer to pause the program playback whenever he desires, fast forward through unwanted program material or commercials, and to replay favorite scenes. However, a VCR cannot both capture and play back information at the same time.

One approach to solving this problem is to use several VCRs. For example, if two video tape recorders are available, it might be possible to Ping-Pong between the two. In this case, the first recorder is started at the beginning of the program of interest. If the viewer wishes to rewind the broadcast, the second recorder begins recording, while the first recorder is halted, rewound to the appropriate place, and playback initiated. However, at least a third video tape recorder is required if the viewer wishes to fast forward to some point in time after the initial rewind was requested. In this case, the third recorder starts recording the broadcast stream while the second is halted and rewound to the appropriate position. Continuing this exercise, one can quickly see that the equipment becomes unwieldy, unreliable, expensive, and hard to operate, while never supporting all desired functions. In addition, tapes are of finite length, and may potentially end at inconvenient times, drastically lowering the value of the solution.

The use of digital computer systems to solve part of this problem has been suggested. U.S. Pat. No. 5,371,551 issued to Logan et al., on Dec. 6, 1994, teaches a method for concurrent video recording and playback using a fixed length circular buffer. It presents a microprocessor controlled broadcast and playback device. Said device compresses and temporarily stores video data onto a hard disk. However, this approach is difficult to implement because the processor requirements for keeping up with the high video rates makes the device expensive and problematic. The microprocessor must be extremely fast to keep up with the incoming and outgoing video data. Further, the circular buffer is meant to function as a delay circuit and does not take into account storing an entire program for longer than the length of the circular buffer.

More recently, digital videos recorders (DVR) have emerged in the marketplace that are based on structures beyond what was previously conceived. One example is U.S. Pat. No. 6,233,389 owned by the Applicant. There are a number of technology trends in force today that are continuing to expand the opportunities for DVR functionality. One such trend is the ability to record data onto a recordable DVD as well as a recordable CD. Currently, DVDs offer a platform that can store up to 15.9 GBs of video and audio data on a single disc. However, a typical recordable DVD can only store approximately five GBs of data.

Although video rates can be highly variable, the average five GB single-sided DVD translates to approximately two hours of video. As the capacity of recordable DVDs increases, the capability to use the media to store broadcast audio and video program material becomes more cost-effective. Even with the lower storage capacities of current recordable DVDs, recordable and pre-recorded DVDs still offer an opportunity to extend the storage and playback capabilities of a DVR.

Some VCR manufacturers have combined dual VCRs into one set-top box in order to facilitate easy transfer of content from one VCR to another. Other manufacturers have integrated DVD players into their VCR set-top boxes in an attempt to offer to two playback mediums. However, these approaches do not take advantage of the recordable DVD and further do not take advantage of storing large amounts of information on a hard disk.

It would be advantageous to provide a digital video recorder system with an integrated DVD recording device that gives a user the ability to record and play back TV broadcast programs and digital video in a set-top box. It would further be advantageous to provide a digital video recorder system with an integrated DVD recording device that integrates a recordable DVD for backing up and playing recorded program material.

SUMMARY OF THE INVENTION

The invention provides a digital video recorder (DVR) system with an integrated DVD recording device. The invention gives a user the ability to record and play back TV broadcast programs and digital video in a set-top box. In addition, the invention integrates a recordable DVD into the set-top box for backing up and playing recorded program material.

A preferred embodiment of the invention accepts television (TV) input streams in a multitude of forms, for example, analog forms such as National Television Standards Committee (NTSC) or PAL broadcast, and digital forms such as Digital Satellite System (DSS), Digital Broadcast Services (DBS), or Advanced Television Standards Committee (ATSC). Analog TV streams are converted to an Moving Pictures Experts Group (MPEG) formatted stream for internal transfer and manipulation, while pre-formatted MPEG streams are extracted from the digital TV signal and presented in a similar format to encoded analog streams.

The invention parses the resulting MPEG stream and stores the stream in temporary buffers. Events are recorded that indicate the type of component that has been found, where it is located, and when it occurred. The program logic is notified that an event has occurred and the data is extracted from the buffers. Indexes within the MPEG stream are determined and saved at predefined intervals. The indexes are stored along with the MPEG stream program material and used to create navigation packets when writing to a DVD inserted into an integrated DVD player/recorder.

The parser and event buffer decouple the CPU from having to parse the MPEG stream and from the real time nature of the data streams. This decoupling allows for slower CPU and bus speeds which translate to lower system costs.

The program material are stored on a hard disk. When a program is requested for display from the hard disk or the integrated DVD player/recorder, the program material are extracted from the hard disk or the integrated DVD player/recorder and reassembled into an MPEG stream. The MPEG stream is sent to a decoder. The decoder converts the MPEG stream into TV output signals and delivers the TV output signals to a TV receiver.

User control commands are accepted and sent through the system. These commands affect the flow of the MPEG stream and allow the user to view stored programs with at least the following special functions: reverse, fast forward, play, pause, index, fast/slow reverse play, and fast/slow play.

The invention can cache the program material being played from the integrated DVD player/recorder onto the hard disk to allow for better control of the special functions.

The user can select program material stored on the hard disk to be written to a DVD inserted in the integrated DVD player/recorder. The invention writes the selected program material to the DVD using the associated stored indexes to create navigation packets. The user can also select program material stored on a DVD to be transferred to the hard disk.

The invention also provides a copyright protection scheme that provides a registration server. The user registers each DVR device that he owns with the registration server. The list of user owned DVRs is distributed to each device on the list. When a DVD is created on a DVR, the DVR's unique serial number or encrypted key is written to the DVD. When the DVD is placed in a DVR, the DVR reads the unique serial number or encrypted key and verifies that the unique serial number or encrypted key is on the user owned DVR list. If the unique serial number or encrypted key is on the list, then the DVR allows reading from the DVD. Otherwise, the DVD is locked out.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a digital video recorder system with an integrated DVD recording device. A system according to the invention gives a user the ability to record and play back TV broadcast programs and digital video in a set-top box. The invention additionally integrates a recordable DVD into the set-top box for backing up, transferring, and playing recorded program material.

Figure 1:
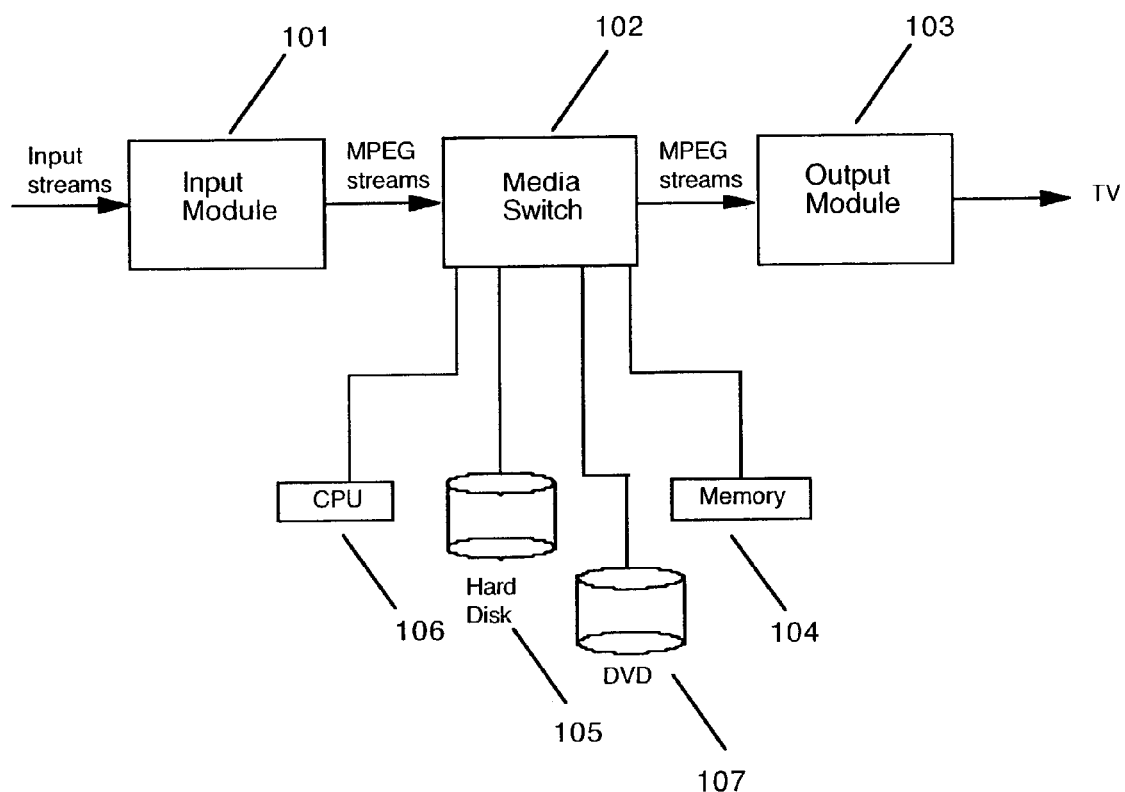
FIG. 1 is a block schematic diagram of a high level view of a preferred embodiment of the invention according to the invention.

Referring to FIG. 1, a preferred embodiment of the invention has an Input Section 101, Media Switch 102, and an Output Section 103. The Input Section 101 takes television (TV) input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC). DBS, DSS and ATSC are based on standards called Moving Pictures Experts Group 2 (MPEG2) and MPEG2 Transport. MPEG2 Transport is a standard for formatting the digital data stream from the TV source transmitter so that a TV receiver can disassemble the input stream to find programs in the multiplexed signal. The Input Section 101 produces MPEG streams. An MPEG2 transport multiplex supports multiple programs in the same broadcast channel, with multiple video and audio feeds and private data. The Input Section 101 tunes the channel to a particular program, extracts a specific MPEG program out of it, and feeds it to the rest of the system. Analog TV signals are encoded into a similar MPEG format using separate video and audio encoders, such that the remainder of the system is unaware of how the signal was obtained. Information may be modulated into the Vertical Blanking Interval (VBI) of the analog TV signal in a number of standard ways; for example, the North American Broadcast Teletext Standard (NABTS) may be used to modulate information onto lines 10 through 20 of an NTSC signal, while the FCC mandates the use of line 21 for Closed Caption (CC) and Extended Data Services (EDS).

Such signals are decoded by the input section and passed to the other sections as if they were delivered via an MPEG2 private data channel.

The Media Switch 102 mediates between a microprocessor CPU 106, hard disk or storage device 105, DVD player/recorder 107, and memory 104. Input streams are converted to an MPEG stream and sent to the Media Switch 102. The Media Switch 102 buffers the MPEG stream into memory. It then performs two operations if the user is watching real time TV: the stream is sent to the Output Section 103 and it is written simultaneously to the hard disk or storage device 105.

The Output Section 103 takes MPEG streams as input and produces an analog TV signal according to the NTSC, PAL, or other required TV standards. The Output Section 103 can also take MPEG streams as input and produce a digital signal that is compatible with digital monitors. The Output Section 103 contains an MPEG decoder, On-Screen Display (OSD) generator, analog TV encoder and audio logic. The OSD generator allows the program logic to supply images which will be overlaid on top of the resulting analog TV signal. Additionally, the Output Section can modulate information supplied by the program logic onto the VBI of the output signal in a number of standard formats, including NABTS, CC and EDS.

The Media Switch 102 allows a user to playback program material stored on the hard disk 105 and also stored on a DVD inserted into the DVD player/recorder 107. The user can transfer program material between the hard disk 105 and the DVD player/recorder 107. The DVD player/recorder 107 records program material stored on the hard disk 105 onto a recordable DVD. The Media Switch 102 also transfers program material from the DVD player/recorder 107 onto the hard disk 105.

Figure 2:
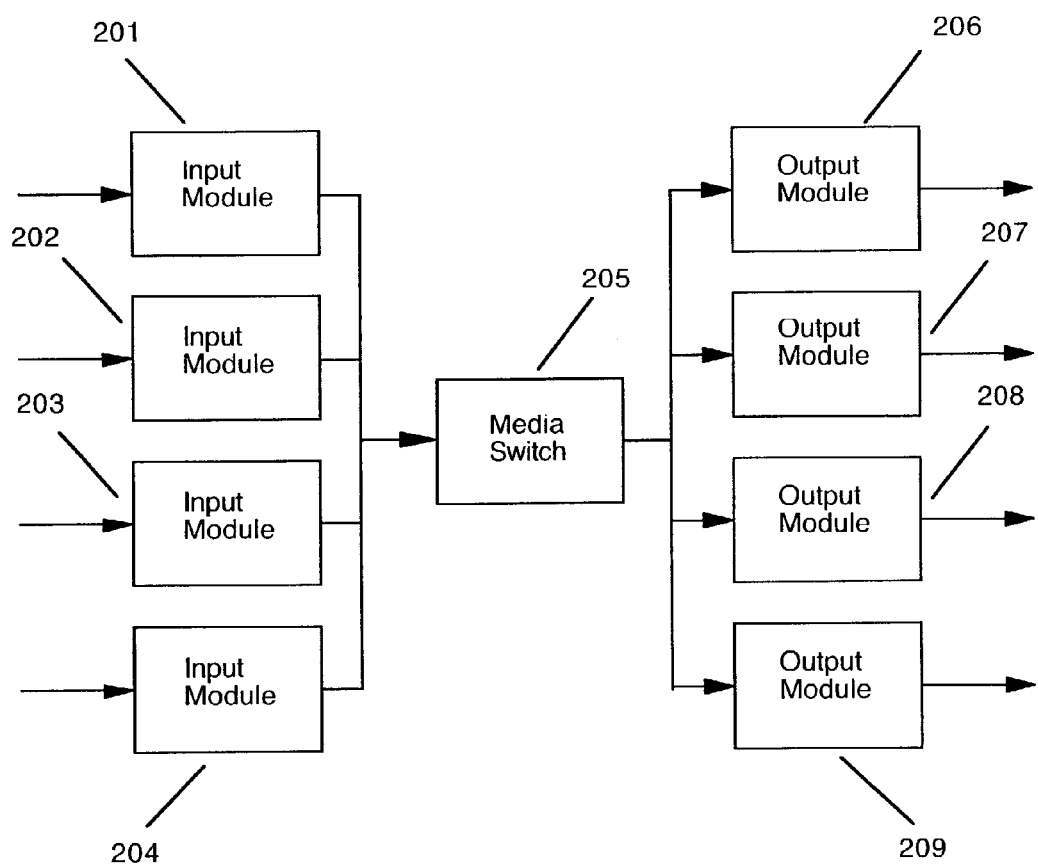
FIG. 2 is a block schematic diagram of a preferred embodiment of the invention using multiple input and output modules according to the invention.

With respect to FIG. 2, the invention easily expands to accommodate multiple Input Sections (tuners) 201, 202, 203, 204, each can be tuned to different types of input. Multiple Output Modules (decoders) 206, 207, 208, 209 are added as well. Special effects such as picture in a picture can be implemented with multiple decoders. The Media Switch 205 records one program while the user is watching another. This means that a stream can be extracted off the disk while another stream is being stored onto the disk.

Figure 3:
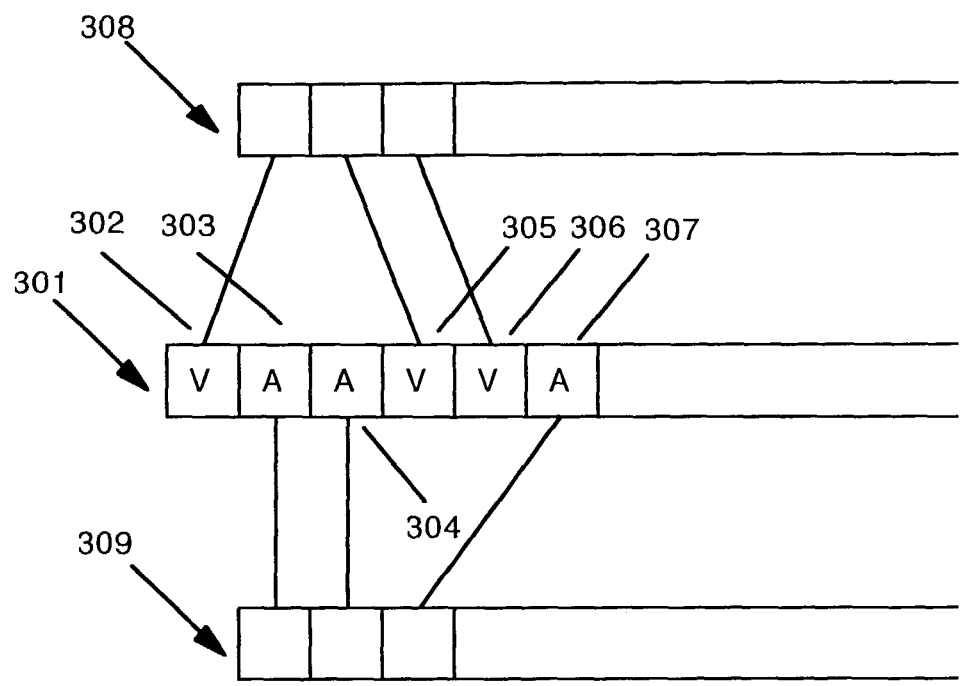
FIG. 3 is a schematic diagram of an Moving Pictures Experts Group (MPEG) data stream and its video and audio components according to the invention.

Referring to FIG. 3, the incoming MPEG stream 301 has interleaved video 302, 305, 306 and audio 303, 304, 307 segments. These elements must be separated and recombined to create separate video 308 and audio 309 streams or buffers. This is necessary because separate decoders are used to convert MPEG elements back into audio or video analog components. Such separate delivery requires that time sequence information be generated so that the decoders may be properly synchronized for accurate playback of the signal.

The Media Switch enables the program logic to associate proper time sequence information with each segment, possibly embedding it directly into the stream. The time sequence information for each segment is called a time stamp. These time stamps are monotonically increasing and start at zero each time the system boots up. This allows the invention to find any particular spot in any particular video segment. For example, if the system needs to read five seconds into an incoming contiguous video stream that is being cached, the system simply has to start reading forward into the stream and look for the appropriate time stamp.

A binary search can be performed on a stored file to index into a stream. Each stream is stored as a sequence of fixed-size segments enabling fast binary searches because of the uniform timestamping. If the user wants to start in the middle of the program, the system performs a binary search of the stored segments until it finds the appropriate spot, obtaining the desired results with a minimal amount of information. If the signal were instead stored as an MPEG stream, it would be necessary to linearly parse the stream from the beginning to find the desired location.

Figure 4:
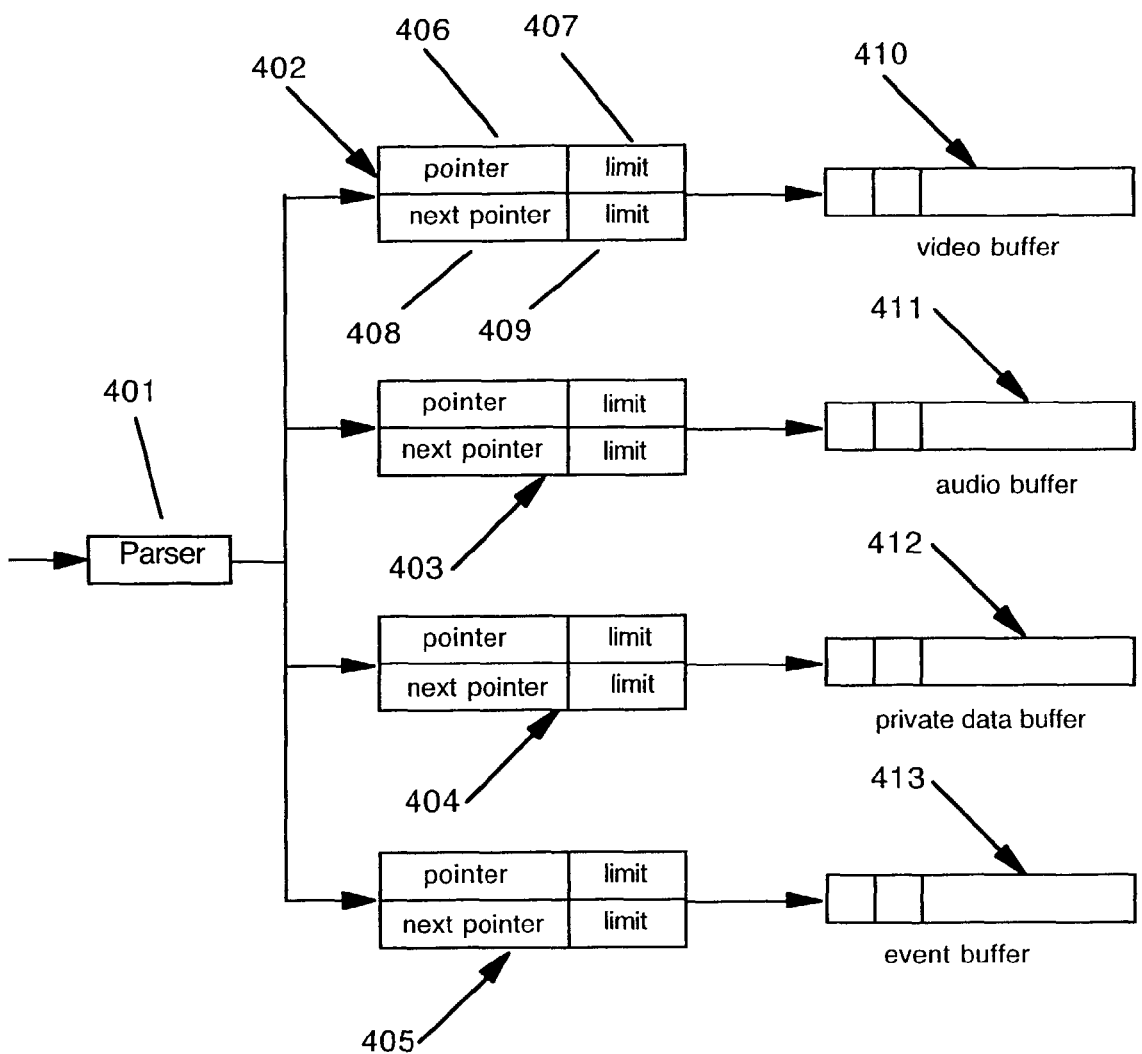
FIG. 4 is a block schematic diagram of a parser and four direct memory access (DMA) input engines contained in the Media Switch according to the invention.

With respect to FIG. 4, the Media Switch contains four input Direct Memory Access (DMA) engines 402, 403, 404, 405 each DMA engine has an associated buffer 410, 411, 412, 413. Conceptually, each DMA engine has a pointer 406, a limit for that pointer 407, a next pointer 408, and a limit for the next pointer 409. Each DMA engine is dedicated to a particular type of information, for example, video 402, audio 403, and parsed events 405. The buffers 410, 411, 412, 413 are circular and collect the specific information. The DMA engine increments the pointer 406 into the associated buffer until it reaches the limit 407 and then loads the next pointer 408 and limit 409. Setting the pointer 406 and next pointer 408 to the same value, along with the corresponding limit value creates a circular buffer. The next pointer 408 can be set to a different address to provide vector DMA.

The input stream flows through a parser 401. The parser 401 parses the stream looking for MPEG distinguished events indicating the start of video, audio or private data segments. For example, when the parser 401 finds a video event, it directs the stream to the video DMA engine 402. The parser 401 buffers up data and DMAs it into the video buffer 410 through the video DMA engine 402. At the same time, the parser 401 directs an event to the event DMA engine 405 which generates an event into the event buffer 413. When the parser 401 sees an audio event, it redirects the byte stream to the audio DMA engine 403 and generates an event into the event buffer 413. Similarly, when the parser 401 sees a private data event, it directs the byte stream to the private data DMA engine 404 and directs an event to the event buffer 413. The Media Switch notifies the program logic via an interrupt mechanism when events are placed in the event buffer.

Figure 5:
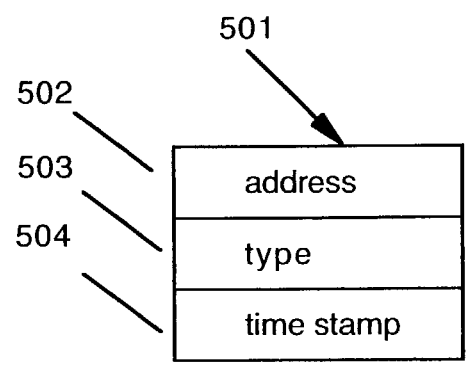
FIG. 5 is a schematic diagram of the components of a packetized elementary stream (PES) buffer according to the invention.

Referring to FIGS. 4 and 5, the event buffer 413 is filled by the parser 401 with events. Each event 501 in the event buffer has an offset 502, event type 503, and time stamp field 504. The parser 401 provides the type and offset of each event as it is placed into the buffer. For example, when an audio event occurs, the event type field is set to an audio event and the offset indicates the location in the audio buffer 411. The program logic knows where the audio buffer 411 starts and adds the offset to find the event in the stream. The address offset 502 tells the program logic where the next event occurred, but not where it ended. The previous event is cached so the end of the current event can be found as well as the length of the segment.

Figure 6:
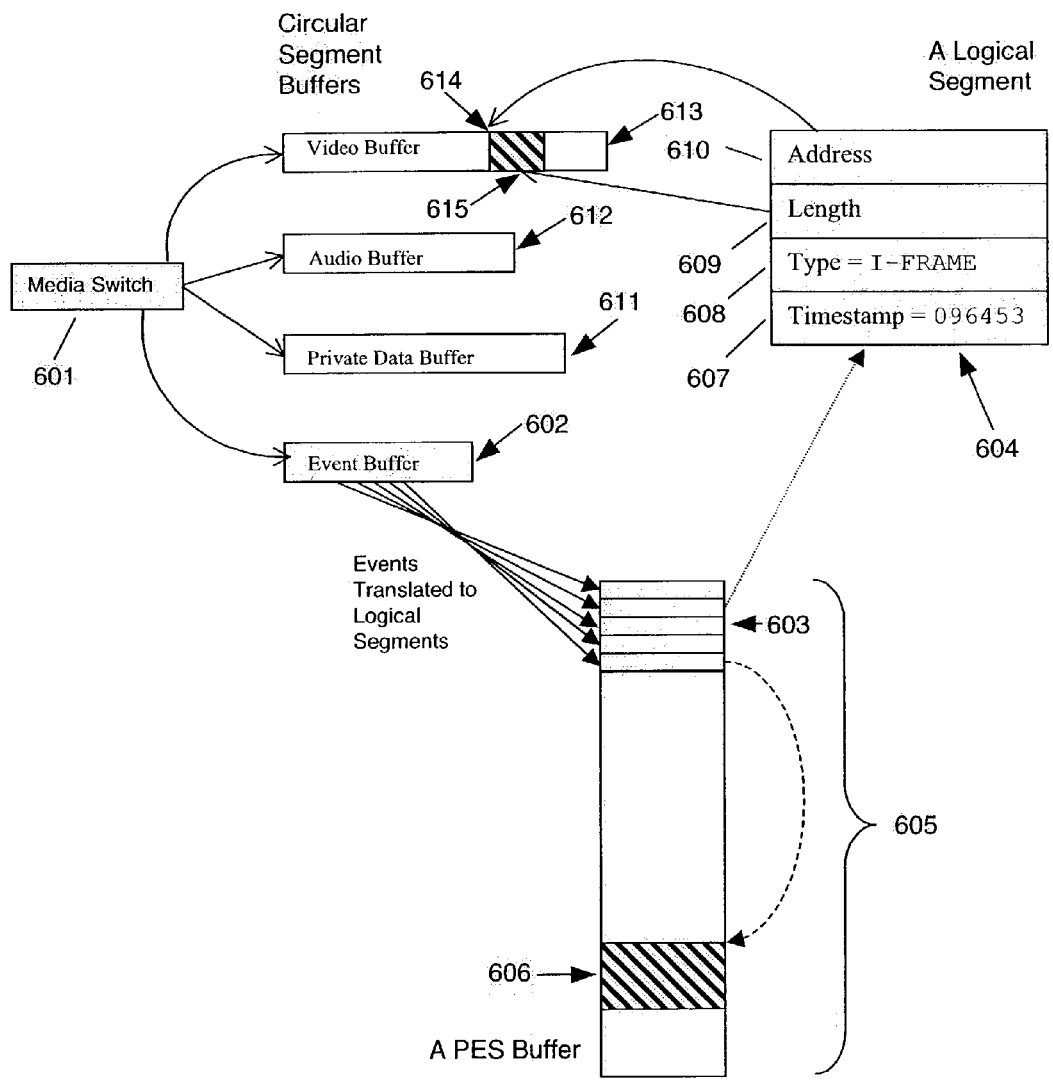
FIG. 6 is a schematic diagram of the construction of a PES buffer from the parsed components in the Media Switch output circular buffers.

With respect to FIGS. 5 and 6, the program logic reads accumulated events in the event buffer 602 when it is interrupted by the Media Switch 601. From these events the program logic generates a sequence of logical segments 603 which correspond to the parsed MPEG segments 615. The program logic converts the offset 502 into the actual address 610 of each segment, and records the event length 609 using the last cached event. If the stream was produced by encoding an analog signal, it will not contain Program Time Stamp (PTS) values, which are used by the decoders to properly present the resulting output. Thus, the program logic uses the generated time stamp 504 to calculate a simulated PTS for each segment and places that into the logical segment timestamp 607. In the case of a digital TV stream, PTS values are already encoded in the stream. The program logic extracts this information and places it in the logical segment timestamp 607.

The program logic continues collecting logical segments 603 until it reaches the fixed buffer size. When this occurs, the program logic generates a new buffer, called a Packetized Elementary Stream (PES) 605 buffer containing these logical segments 603 in order, plus ancillary control information. Each logical segment points 604 directly to the circular buffer, e.g., the video buffer 613, filled by the Media Switch 601. This new buffer is then passed to other logic components, which may further process the stream in the buffer in some way, such as presenting it for decoding or writing it to the storage media. Thus, the MPEG data is not copied from one location in memory to another by the processor. This results in a more cost effective design since lower memory bandwidth and processor bandwidth is required.

A unique feature of the MPEG stream transformation into PES buffers is that the data associated with logical segments need not be present in the buffer itself, as presented above. When a PES buffer is written to storage, these logical segments are written to the storage medium in the logical order in which they appear. This has the effect of gathering components of the stream, whether they be in the video, audio or private data circular buffers, into a single linear buffer of stream data on the storage medium. The buffer is read back from the storage medium with a single transfer from the storage media, and the logical segment information is updated to correspond with the actual locations in the buffer 606. Higher level program logic is unaware of this transformation, since it handles only the logical segments, thus stream data is easily managed without requiring that the data ever be copied between locations in DRAM by the CPU.

A unique aspect of the Media Switch is the ability to handle high data rates effectively and inexpensively. It performs the functions of taking video and audio data in, sending video and audio data out, sending video and audio data to disk or DVD and extracting video and audio data from the disk or DVD on a low cost platform. Generally, the Media Switch runs asynchronously and autonomously with the microprocessor CPU, using its DMA capabilities to move large quantities of information with minimal intervention by the CPU.

Figure 7:
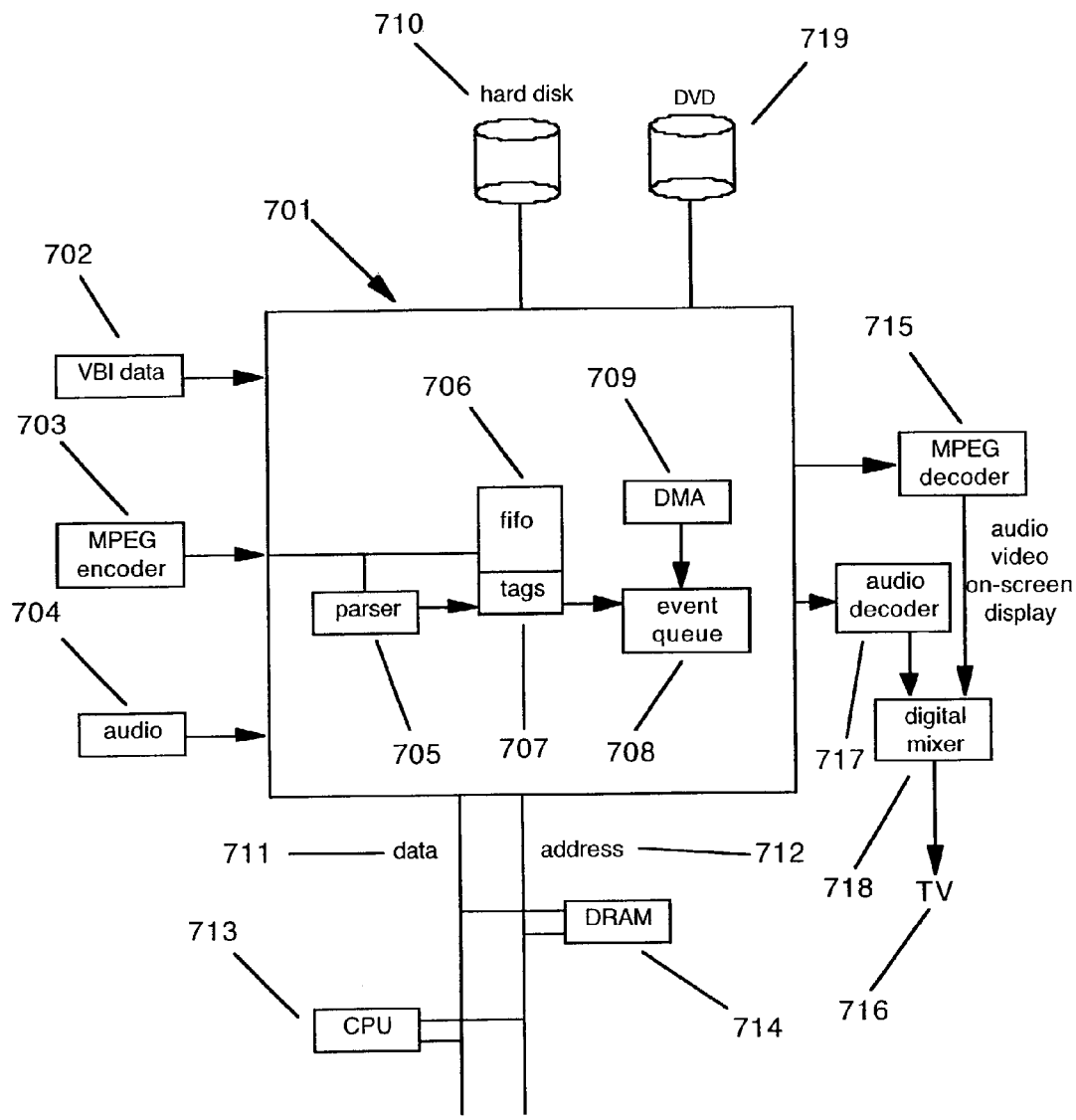
FIG. 7 is a block schematic diagram of the Media Switch and the various components that it communicates with according to the invention.

Referring to FIG. 7, the input side of the Media Switch 701 is connected to an MPEG encoder 703. There are also circuits specific to MPEG audio 704 and vertical blanking interval (VBI) data 702 feeding into the Media Switch 701. If a digital TV signal is being processed instead, the MPEG encoder 703 is replaced with an MPEG2 Transport Demultiplexor, and the MPEG audio encoder 704 and VBI decoder 702 are deleted. The demultiplexor multiplexes the extracted audio, video and private data channel streams through the video input Media Switch port.

The parser 705 parses the input data stream from the MPEG encoder 703, audio encoder 704 and VBI decoder 702, or from the transport demultiplexor in the case of a digital TV stream. The parser 705 detects the beginning of all of the important events in a video or audio stream, the start of all of the frames, the start of sequence headers—all of the pieces of information that the program logic needs to know about in order to both properly play back and perform special effects on the stream, e.g. fast forward, reverse, play, pause, fast/slow play, indexing, and fast/slow reverse play.

The parser 705 places tags 707 into the FIFO 706 when it identifies video or audio segments, or is given private data. The DMA 709 controls when these tags are taken out. The tags 707 and the DMA addresses of the segments are placed into the event queue 708. The frame type information, whether it is a start of a video I-frame, video B-frame, video P-frame, video PES, audio PES, a sequence header, an audio frame, or private data packet, is placed into the event queue 708 along with the offset in the related circular buffer where the piece of information was placed. The program logic operating in the CPU 713 examines events in the circular buffer after it is transferred to the DRAM 714.

The Media Switch 701 has a data bus 711 that connects to the CPU 713 and DRAM 714. An address bus 712 is also shared between the Media Switch 701, CPU 713, and DRAM 714. A hard disk or storage device 710 is connected to one of the ports of the Media Switch 701. A DVD player/recorder 719 is also connected to one of the ports of the Media Switch 701. The Media Switch 701 outputs streams to an MPEG video decoder 715 and a separate audio decoder 717. The audio decoder 717 signals contain audio cues generated by the system in response to the user's commands on a remote control or other internal events. The decoded audio output from the MPEG decoder is digitally mixed 718 with the separate audio signal. The resulting signals contain video, audio, and on-screen displays and are sent to the TV 716.

The Media Switch 701 takes in 8-bit data and sends it to the disk, while at the same time extracts another stream of data off of the disk and sends it to the MPEG decoder 715. All of the DMA engines described above can be working at the same time. The Media Switch 701 can be implemented in hardware using a Field Programmable Gate Array (FPGA), ASIC, or discrete logic.

Rather than having to parse through an immense data stream looking for the start of where each frame would be, the program logic only has to look at the circular event buffer in DRAM 714 and it can tell where the start of each frame is and the frame type. This approach saves a large amount of CPU power, keeping the real time requirements of the CPU 713 small. The CPU 713 does not have to be very fast at any point in time. The Media Switch 701 gives the CPU 713 as much time as possible to complete tasks. The parsing mechanism 705 and event queue 708 decouple the CPU 713 from parsing the audio, video, and buffers and the real time nature of the streams, which allows for lower costs. It also allows the use of a bus structure in a CPU environment that operates at a much lower clock rate with much cheaper memory than would be required otherwise.

The CPU 713 has the ability to queue up one DMA transfer and can set up the next DMA transfer at its leisure. This gives the CPU 713 large time intervals within which it can service the DMA controller 709. The CPU 713 may respond to a DMA interrupt within a larger time window because of the large latency allowed. MPEG streams, whether extracted from an MPEG2 Transport or encoded from an analog TV signal, are typically encoded using a technique called Variable Bit Rate encoding (VBR). This technique varies the amount of data required to represent a sequence of images by the amount of movement between those images. This technique can greatly reduce the required bandwidth for a signal, however sequences with rapid movement (such as a basketball game) may be encoded with much greater bandwidth requirements. For example, the Hughes DirecTV satellite system encodes signals with anywhere from 1 to 10 Mb/s of required bandwidth, varying from frame to frame. It would be difficult for any computer system to keep up with such rapidly varying data rates without this structure.

The parser 705 parses the output from the DVD player 719. The parser 705 can parse the DVD output to the hard disk 710, which allows the DVD output to be buffered. The buffering allows DVD events to be recognized (described below) which allows the system to perform special effects on the DVD output stream. The DVD output can also be sent through the same route as live input streams without the having to cache DVD output onto the hard disk 710, thus bypassing any copyright concerns.

The DVD output can also be from a DVD pre-recorded by the invention containing pre-parsed information that allows the invention to perform special effects without caching content onto the hard disk 710 and display program information (e.g., program title, actor's names, genre, program description, etc.).

Figure 14:
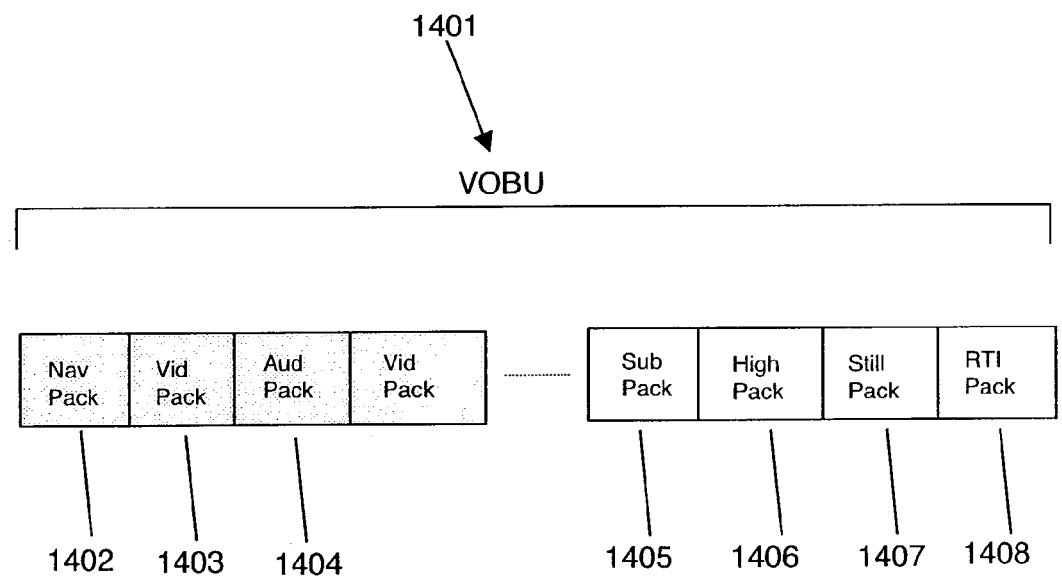
FIG. 14 is a block schematic diagram of an MPEG standard Video Object Unit (VOBU) layout.

Referring to FIG. 14, DVD-video and DVD-audio information is laid out on the DVD in Video Object Units (VOBU). A VOBU for a DVD-video format can have a navigation packet 1402, one or more video packets 1403, one or more audio packets 1404, and one or more subpicture packets 1405. DVD-audio formats use the highlight packets 1406, still packets 1407, and RT text packets 1408. A VOBU does not always contain video.

Navigation packets 1402 contain information that determines how the physical data is accessed. The video 1403 and audio 1404 packets carry the video and audio content in recording order. Subpicture information 1405 overlays the video for subtitles, captions, menus, etc.

The video VOBUs are compliant with the MPEG program stream standard. VOBUs that contain video are organized as an MPEG group of pictures (GOP). This means that the parser 705 receives the same information format from the DVD player 719 as it does from the MPEG encoder 703.

Figure 8:
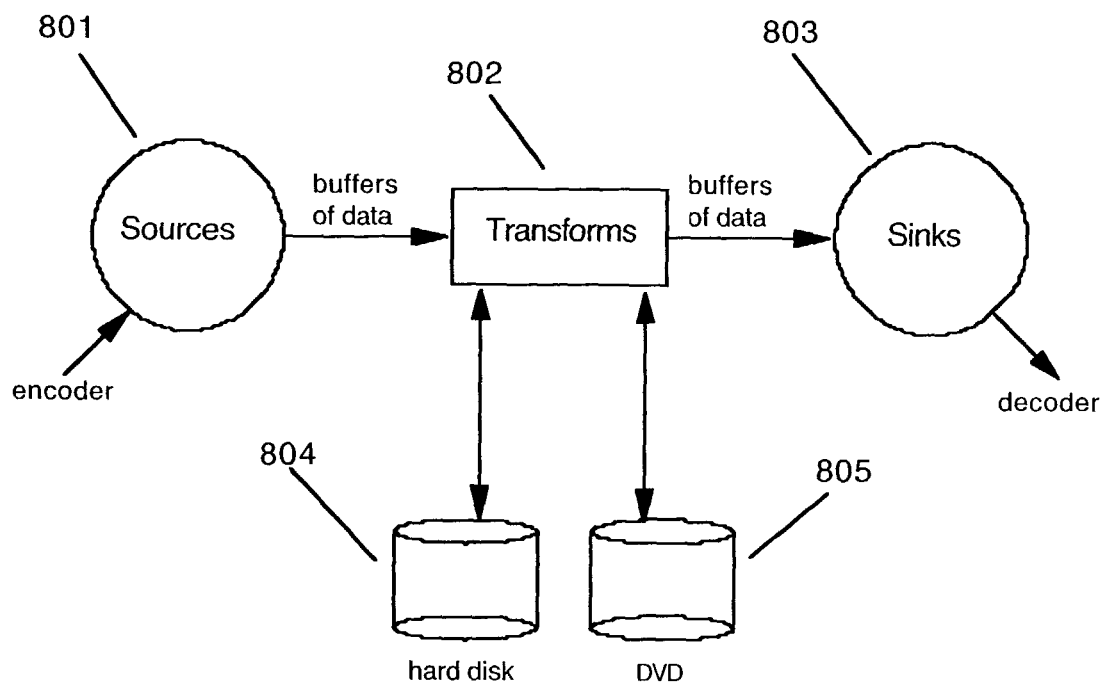
FIG. 8 is a block schematic diagram of a high level view of the program logic according to the invention.

With respect to FIG. 8, the program logic within the CPU has three conceptual components: sources 801, transforms 802, and sinks 803. The sources 801 produce buffers of data. Transforms 802 process buffers of data and sinks 803 consume buffers of data. A transform is responsible for allocating and queuing the buffers of data on which it will operate. Buffers are allocated as if "empty" to sources of data, which give them back "full". The buffers are then queued and given to sinks as "full", and the sink will return the buffer "empty".

A source 801 accepts data from encoders, e.g., a digital satellite receiver. It acquires buffers for this data from the downstream transform, packages the data into a buffer, then pushes the buffer down the pipeline as described above. The source object 801 does not know anything about the rest of the system. The sink 803 consumes buffers, taking a buffer from the upstream transform, sending the data to the decoder, and then releasing the buffer for reuse.

There are two types of transforms 802 used: spatial and temporal. Spatial transforms are transforms that perform, for example, an image convolution or compression/decompression on the buffered data that is passing through. Temporal transforms are used when there is no time relation that is expressible between buffers going in and buffers coming out of a system. Such a transform writes the buffer to a file 804 on the storage medium. The buffer is pulled out at a later time, sent down the pipeline, and properly sequenced within the stream.

The transform 802 is used for writing buffers to a recordable DVD in the DVD player/recorder 805. Sequenced buffers are written to the recordable DVD in several formats: a standard DVD format containing periodic navigation packets that allow the DVD to be played by any DVD player; and/or a custom format that the invention understands which contains information needed for program information display and special effects.

The system must create navigation packs when writing to a DVD. When recording a show from any source the system can create index marks which are needed for the navigation pack. The index marks are pointers to frames indexed at predefined time intervals in the program material and are stored as overhead with the program material. Later on, when the user selects program material to be written from the hard drive to a DVD, the navigation data already exists to set up the navigation pack data for recording. The indexes can also be created on-the-fly when the program material is being read from the hard drive and written to the DVD. Further, navigation packets can be arbitrarily placed within a program material stream and stored in a VOBU on the DVD.

Transform 802 also pulls buffers from the DVD player/recorder 805 when playing a DVD. The buffers are identified and sent down the pipeline in the same manner as when buffers are pulled from files on the storage medium 804.

Figure 15:
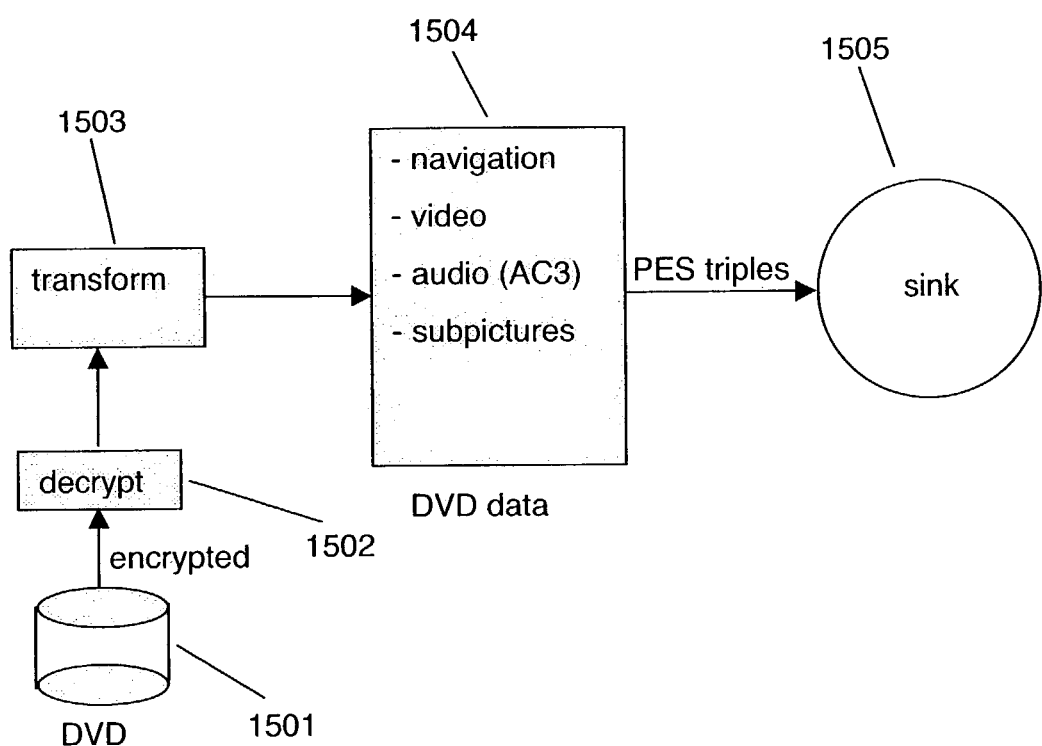
FIG. 15 is a block schematic diagram of a DVD interface with the invention's transform and sink architecture according to the invention.

With respect to FIG. 15, DVD 1501 acts as a source to DVD transform 1503. Encrypted data stream from the DVD 1501 is decrypted 1502 before being routed to the DVD transform 1503. Buffers of data are sent to the DVD transform 1503.

The DVD transform 1503 receives data that contains navigation, video, audio, and subpicture information 1504 and transforms the data into PES triples. The PES triples are sent to the sink 1505. The sink 1505 operates as described throughout.

DVD data can be prefetched from the DVD 1501 before processing through the system to make up for DVD latencies. For special effects, the system looks at GOP frames. In fast forward (3×), the system jumps to the next frame using the GOP info. For faster speeds, the system needs to scan ahead for the GOP frames. This method is needed when the program material is not allowed to touch the hard disk.

Otherwise, data can be buffered on the hard disk. The data gets decrypted and sent through the transform 1503 and stored on the hard disk. If there is a problem (such as copyright issues) with the program material being on the hard disk in raw form, then the system can store the data on the hard disk after it runs the data through the encrypter, thereby preserving the copy protection of the data. Data are decrypted before sending to the sink 1505.

Figure 9:
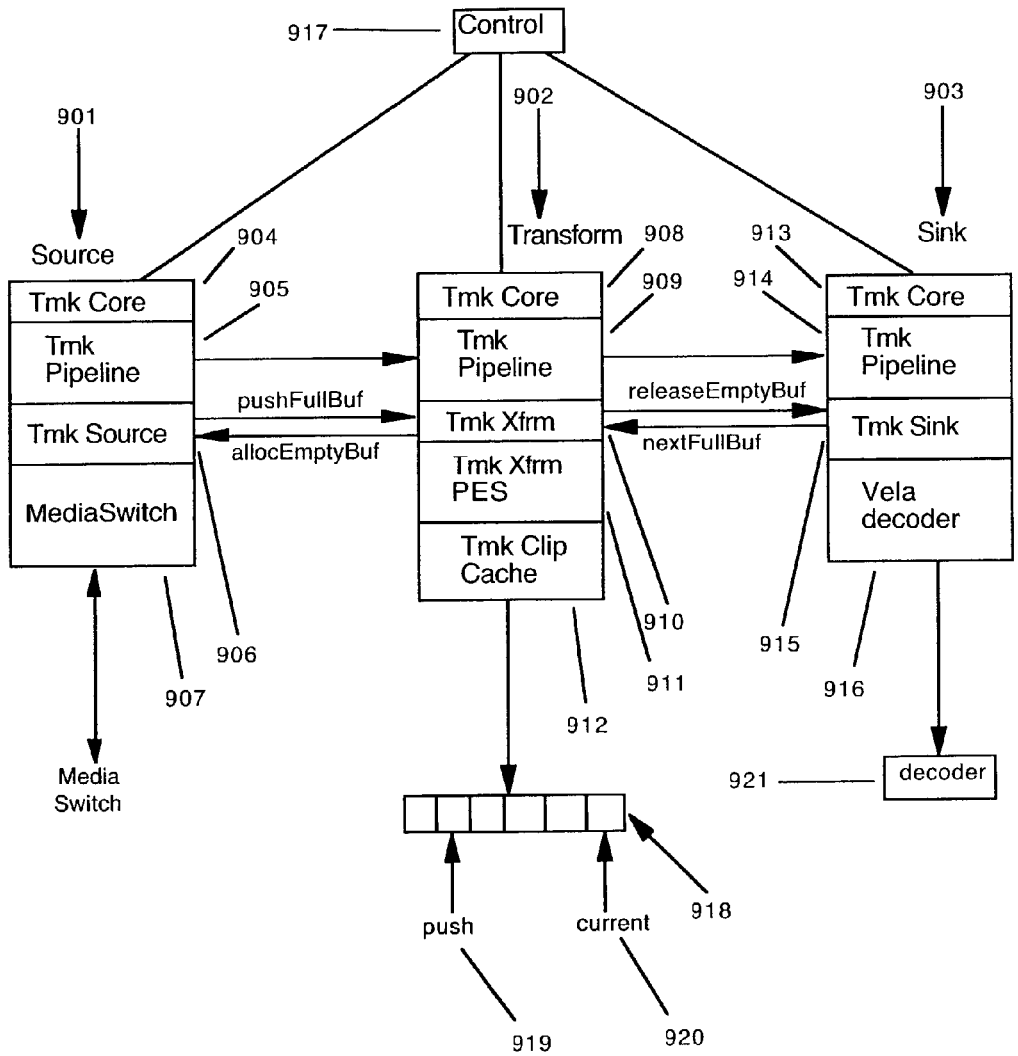
FIG. 9 is a block schematic diagram of a class hierarchy of the program logic according to the invention.

Referring to FIG. 9, a C++ class hierarchy derivation of the program logic is shown. The TiVo Media Kernel (Tmk) 904, 908, 913 mediates with the operating system kernel. The kernel provides operations such as: memory allocation, synchronization, and threading. The TmkCore 904, 908, 913 structures memory taken from the media kernel as an object. It provides operators, new and delete, for constructing and deconstructing the object. Each object (source 901, transform 902, and sink 903) is multi-threaded by definition and can run in parallel.

The TmkPipeline class 905, 909, 914 is responsible for flow control through the system. The pipelines point to the next pipeline in the flow from source 901 to sink 903. To pause the pipeline, for example, an event called "pause" is sent to the first object in the pipeline. The event is relayed on to the next object and so on down the pipeline. This all happens asynchronously to the data going through the pipeline. Thus, similar to applications such as telephony, control of the flow of MPEG streams is asynchronous and separate from the streams themselves. This allows for a simple logic design that is at the same time powerful enough to support the features described previously, including pause, rewind, fast forward and others. In addition, this structure allows fast and efficient switching between stream sources, since buffered data can be simply discarded and decoders reset using a single event, after which data from the new stream will pass down the pipeline. Such a capability is needed, for example, when switching the channel being captured by the input section, or when switching between a live signal from the input section and a stored stream.

The source object 901 is a TmkSource 906 and the transform object 902 is a TmkXform 910. These are intermediate classes that define standard behaviors for the classes in the pipeline. Conceptually, they handshake buffers down the pipeline. The source object 901 takes data out of a physical data source, such as the Media Switch, and places it into a PES buffer. To obtain the buffer, the source object 901 asks the down stream object in his pipeline for a buffer (allocEmptyBuf). The source object 901 is blocked until there is sufficient memory. This means that the pipeline is self-regulating; it has automatic flow control. When the source object 901 has filled up the buffer, it hands it back to the transform 902 through the pushFullBuf function.

The sink 903 is flow controlled as well. It calls nextFullBuf which tells the transform 902 that it is ready for the next filled buffer. This operation can block the sink 903 until a buffer is ready. When the sink 903 is finished with a buffer (i.e., it has consumed the data in the buffer) it calls releaseEmptyBuf. ReleaseEmptyBuf gives the buffer back to the transform 902. The transform 902 can then hand that buffer, for example, back to the source object 901 to fill up again. In addition to the automatic flow-control benefit of this method, it also provides for limiting the amount of memory dedicated to buffers by allowing enforcement of a fixed allocation of buffers by a transform. This is an important feature in achieving a cost-effective limited DRAM environment.

The MediaSwitch class 909 calls the allocEmptyBuf method of the TmkClipCache 912 object and receives a PES buffer from it. It then goes out to the circular buffers in the Media Switch hardware and generates PES buffers. The MediaSwitch class 909 fills the buffer up and pushes it back to the TmkClipCache 912 object.

The TmkClipCache 912 maintains a cache file 918 on a storage medium. It also maintains two pointers into this cache: a push pointer 919 that shows where the next buffer coming from the source 901 is inserted; and a current pointer 920 which points to the current buffer used.

The buffer that is pointed to by the current pointer is handed to the Vela decoder class 916. The Vela decoder class 916 talks to the decoder 921 in the hardware. The decoder 921 produces a decoded TV signal that is subsequently encoded into an analog TV signal in NTSC, PAL or other analog format. When the Vela decoder class 916 is finished with the buffer it calls releaseEmptyBuf.

The structure of the classes makes the system easy to test and debug. Each level can be tested separately to make sure it performs in the appropriate manner, and the classes may be gradually aggregated to achieve the desired functionality while retaining the ability to effectively test each object.

The control object 917 accepts commands from the user and sends events into the pipeline to control what the pipeline is doing. For example, if the user has a remote control and is watching TV, the user presses pause and the control object 917 sends an event to the sink 903, that tells it pause. The sink 903 stops asking for new buffers. The current pointer 920 stays where it is at. The sink 903 starts taking buffers out again when it receives another event that tells it to play. The system is in perfect synchronization; it starts from the frame that it stopped at.

The remote control may also have a fast forward key. When the fast forward key is pressed, the control object 917 sends an event to the transform 902, that tells it to move forward two seconds. The transform 902 finds that the two second time span requires it to move forward three buffers. It then issues a reset event to the downstream pipeline, so that any queued data or state that may be present in the hardware decoders is flushed. This is a critical step, since the structure of MPEG streams requires maintenance of state across multiple frames of data, and that state will be rendered invalid by repositioning the pointer. It then moves the current pointer 920 forward three buffers. The next time the sink 903 calls nextFullBuf it gets the new current buffer. The same method works for fast reverse in that the transform 902 moves the current pointer 920 backwards.

A system clock reference resides in the decoder. The system clock reference is sped up for fast play or slowed down for slow play. The sink simply asks for full buffers faster or slower, depending on the clock speed.

Figure 10:
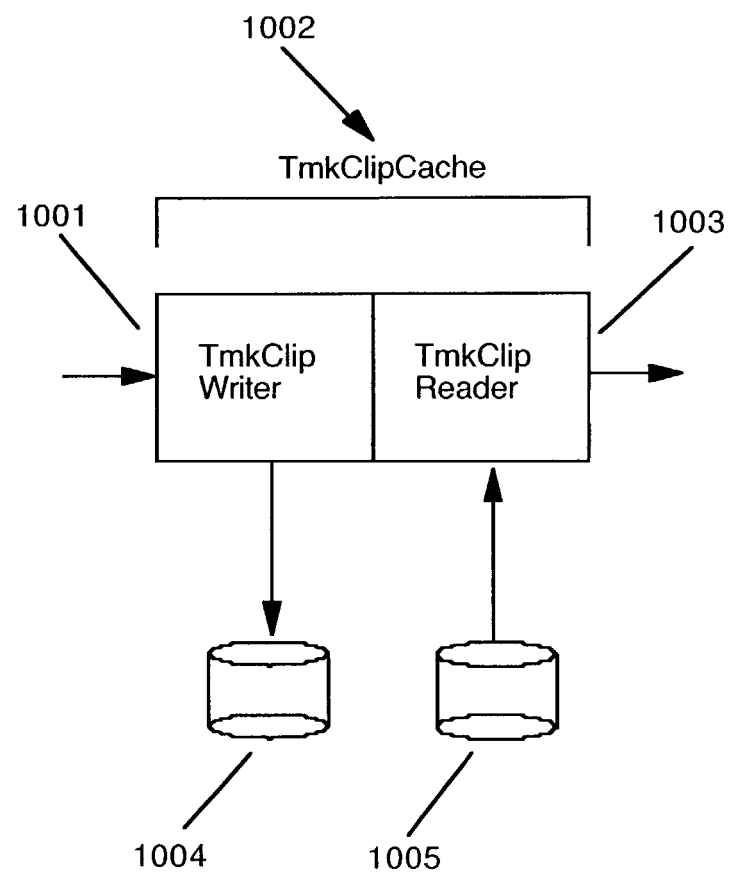
FIG. 10 is a block schematic diagram of a preferred embodiment of the clip cache component of the invention according to the invention.

With respect to FIG. 10, two other objects derived from the TmkXform class are placed in the pipeline for disk access. One is called TmkClipReader 1003 and the other is called TmkClipWriter 1001. Buffers come into the TmkClipWriter 1001 and are pushed to a file on a storage medium 1004. TmkClipReader 1003 asks for buffers which are taken off of a file on a storage medium 1005. A TmkClipReader 1003 provides only the allocEmptyBuf and pushFullBuf methods, while a TmkClipWriter 1001 provides only the nextFullBuf and releaseEmptyBuf methods. A TmkClipReader 1003 therefore performs the same function as the input, or "push" side of a TmkClipCache 1002, while a TmkClipWriter 1001 therefore performs the same function as the output, or "pull" side of a TmkClipCache 1002.

Figure 11:
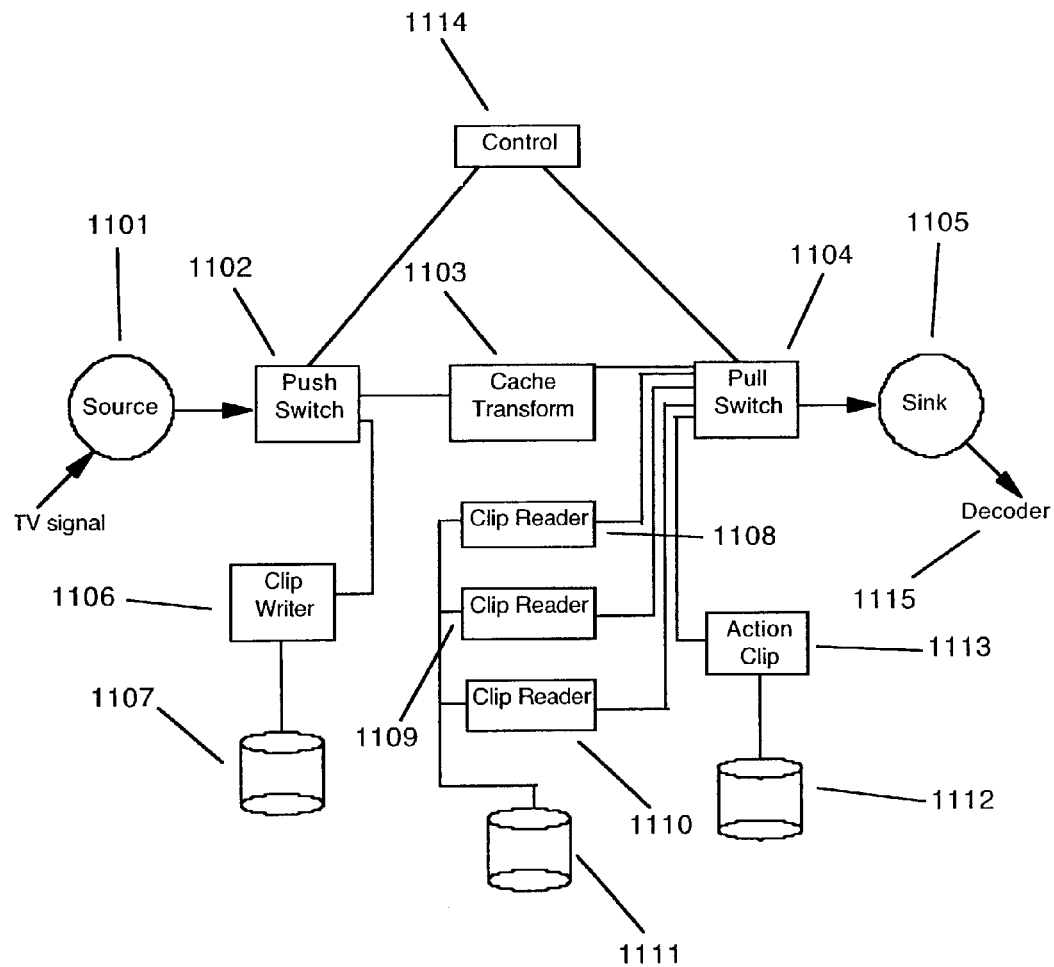
FIG. 11 is a block schematic diagram of a preferred embodiment of the invention that emulates a broadcast studio video mixer according to the invention.

Referring to FIG. 11, a preferred embodiment that accomplishes multiple functions is shown. A source 1101 has a TV signal input. The source sends data to a PushSwitch 1102 which is a transform derived from TmkXform. The PushSwitch 1102 has multiple outputs that can be switched by the control object 1114. This means that one part of the pipeline can be stopped and another can be started at the users whim. The user can switch to different storage devices. The PushSwitch 1102 could output to a TmkClipWriter 1106, which goes onto a storage device 1107 or write to the cache transform 1103.

An important feature of this apparatus is the ease with which it can selectively capture portions of an incoming signal under the control of program logic. Based on information such as the current time, or perhaps a specific time span, or perhaps via a remote control button press by the viewer, a TmkClipWriter 1106 may be switched on to record a portion of the signal, and switched off at some later time. This switching is typically caused by sending a "switch" event to the PushSwitch 1102 object.

An additional method for triggering selective capture is through information modulated into the VBI or placed into an MPEG private data channel. Data decoded from the VBI or private data channel is passed to the program logic. The program logic examines this data to determine if the data indicates that capture of the TV signal into which it was modulated should begin. Similarly, this information may also indicate when recording should end, or another data item may be modulated into the signal indicating when the capture should end. The starting and ending indicators may be explicitly modulated into the signal or other information that is placed into the signal in a standard fashion may be used to encode this information.

Figure 12:
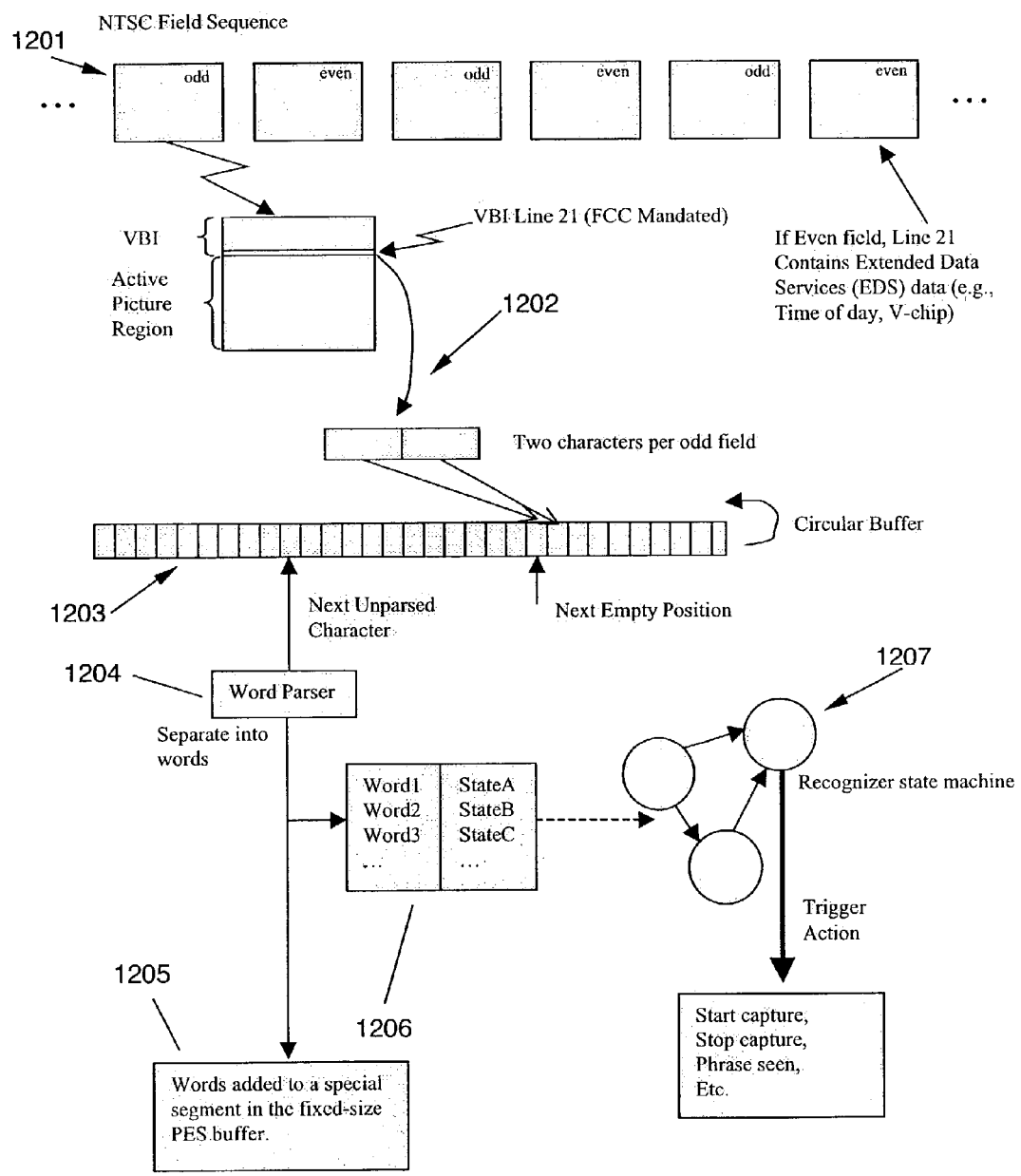
FIG. 12 is a block schematic diagram of a closed caption parser according to the invention.

With respect to FIG. 12, an example is shown which demonstrates how the program logic scans the words contained within the closed caption (CC) fields to determine starting and ending times, using particular words or phrases to trigger the capture. A stream of NTSC or PAL fields 1201 is presented. CC bytes are extracted from each odd field 1202, and entered in a circular buffer 1203 for processing by the Word Parser 1204. The Word Parser 1204 collects characters until it encounters a word boundary, usually a space, period or other delineating character. Recall from above, that the MPEG audio and video segments are collected into a series of fixed-size PES buffers. A special segment is added to each PES buffer to hold the words extracted from the CC field 1205. Thus, the CC information is preserved in time synchronization with the audio and video, and can be correctly presented to the viewer when the stream is displayed. This also allows the stored stream to be processed for CC information at the leisure of the program logic, which spreads out load, reducing cost and improving efficiency. In such a case, the words stored in the special segment are simply passed to the state table logic 1206.

During stream capture, each word is looked up in a table 1206 which indicates the action to take on recognizing that word. This action may simply change the state of the recognizer state machine 1207, or may cause the state machine 1207 to issue an action request, such as "start capture", "stop capture", "phrase seen", or other similar requests. Indeed, a recognized word or phrase may cause the pipeline to be switched; for example, to overlay a different audio track if undesirable language is used in the program.

Note that the parsing state table 1206 and recognizer state machine 1207 may be modified or changed at any time. For example, a different table and state machine may be provided for each input channel. Alternatively, these elements may be switched depending on the time of day, or because of other events.

Referring to FIG. 11, a PullSwitch is added 1104 which outputs to the sink 1105. The sink 1105 calls nextFullBuf and releaseEmptyBuf to get or return buffers from the PullSwitch 1104. The PullSwitch 1104 can have any number of inputs. One input could be an ActionClip 1113. The remote control can switch between input sources. The control object 1114 sends an event to the PullSwitch 1104, telling it to switch. It will switch from the current input source to whatever input source the control object selects.

An ActionClip class provides for sequencing a number of different stored signals in a predictable and controllable manner, possibly with the added control of viewer selection via a remote control. Thus, it appears as a derivative of a TmkX-form object that accepts a "switch" event for switching to the next stored signal.

This allows the program logic or user to create custom sequences of video output. Any number of video segments can be lined up and combined as if the program logic or user were using a broadcast studio video mixer. TmkClipReaders 1108, 1109, 1110 are allocated and each is hooked into the PullSwitch 1104. The PullSwitch 1104 switches between the TmkClipReaders 1108, 1109, 1110 to combine video and audio clips. Flow control is automatic because of the way the pipeline is constructed. The Push and Pull Switches are the same as video switches in a broadcast studio.

The derived class and resulting objects described here may be combined in an arbitrary way to create a number of different useful configurations for storing, retrieving, switching and viewing of TV streams. For example, if multiple input and output sections are available, one input is viewed while another is stored, and a picture-in-picture window generated by the second output is used to preview previously stored streams. Such configurations represent a unique and novel application of software transformations to achieve the functionality expected of expensive, sophisticated hardware solutions within a single cost-effective device.

Figure 13:
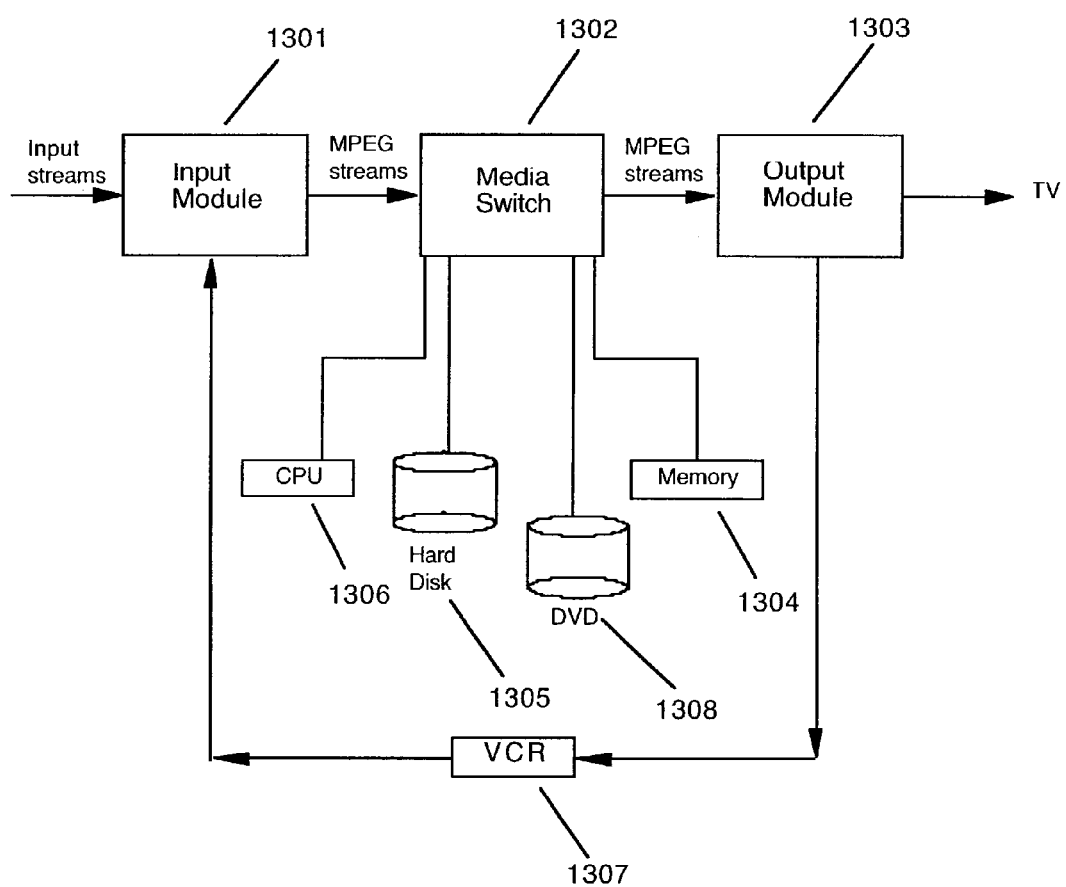
FIG. 13 is a block schematic diagram of a high level view of a preferred embodiment of the invention utilizing a VCR as an integral component of the invention according to the invention.

With respect to FIG. 13, a high-level system view is shown which implements a VCR backup. The Output Module 1303 sends TV signals to the VCR 1307. This allows, the user to record TV programs directly on to video tape. The invention allows the user to queue up programs from disk to be recorded on to video tape and to schedule the time that the programs are sent to the VCR 1307. Title pages (EPG data) can be sent to the VCR 1307 before a program is sent. Longer programs can be scaled to fit onto smaller video tapes by speeding up the play speed or dropping frames.

The VCR 1307 output can also be routed back into the Input Module 1301. In this configuration the VCR acts as a backup system for the Media Switch 1302. Any overflow storage or lower priority programming is sent to the VCR 1307 for later retrieval.

The Input Module 1301 can decode and pass to the remainder of the system information encoded on the Vertical Blanking Interval (VBI). The Output Module 1303 can encode into the output VBI data provided by the remainder of the system. The program logic may arrange to encode identifying information of various kinds into the output signal, which will be recorded onto tape using the VCR 1307. Playing this tape back into the input allows the program logic to read back this identifying information, such that the TV signal recorded on the tape is properly handled. For example, a particular program may be recorded to tape along with information about when it was recorded, the source network, etc. When this program is played back into the Input Module, this information can be used to control storage of the signal, presentation to the viewer, etc.

One skilled in the art will readily appreciate that such a mechanism may be used to introduce various data items to the program logic which are not properly conceived of as television signals. For instance, software updates or other data may be passed to the system. The program logic receiving this data from the television stream may impose controls on how the data is handled, such as requiring certain authentication sequences and/or decrypting the embedded information according to some previously acquired key. Such a method works for normal broadcast signals as well, leading to an efficient means of providing non-TV control information and data to the program logic.

Additionally, one skilled in the art will readily appreciate that although a VCR is specifically mentioned above, any multimedia recording device (e.g., a Digital Video Disk-Random Access Memory (DVD-RAM) recorder) is easily substituted in its place.

Although the invention is described herein with reference to the preferred embodiment, one skilled in the art will readily appreciate that other applications may be substituted for those set forth herein without departing from the spirit and scope of the present invention. For example, the invention can be used in the detection of gambling casino crime. The input section of the invention is connected to the casino's video surveillance system. Recorded video is cached and simultaneously output to external VCRs. The user can switch to any video feed and examine (i.e., rewind, play, slow play, fast forward, etc.) a specific segment of the recorded video while the external VCRs are being loaded with the real-time input video.

Figure 16:
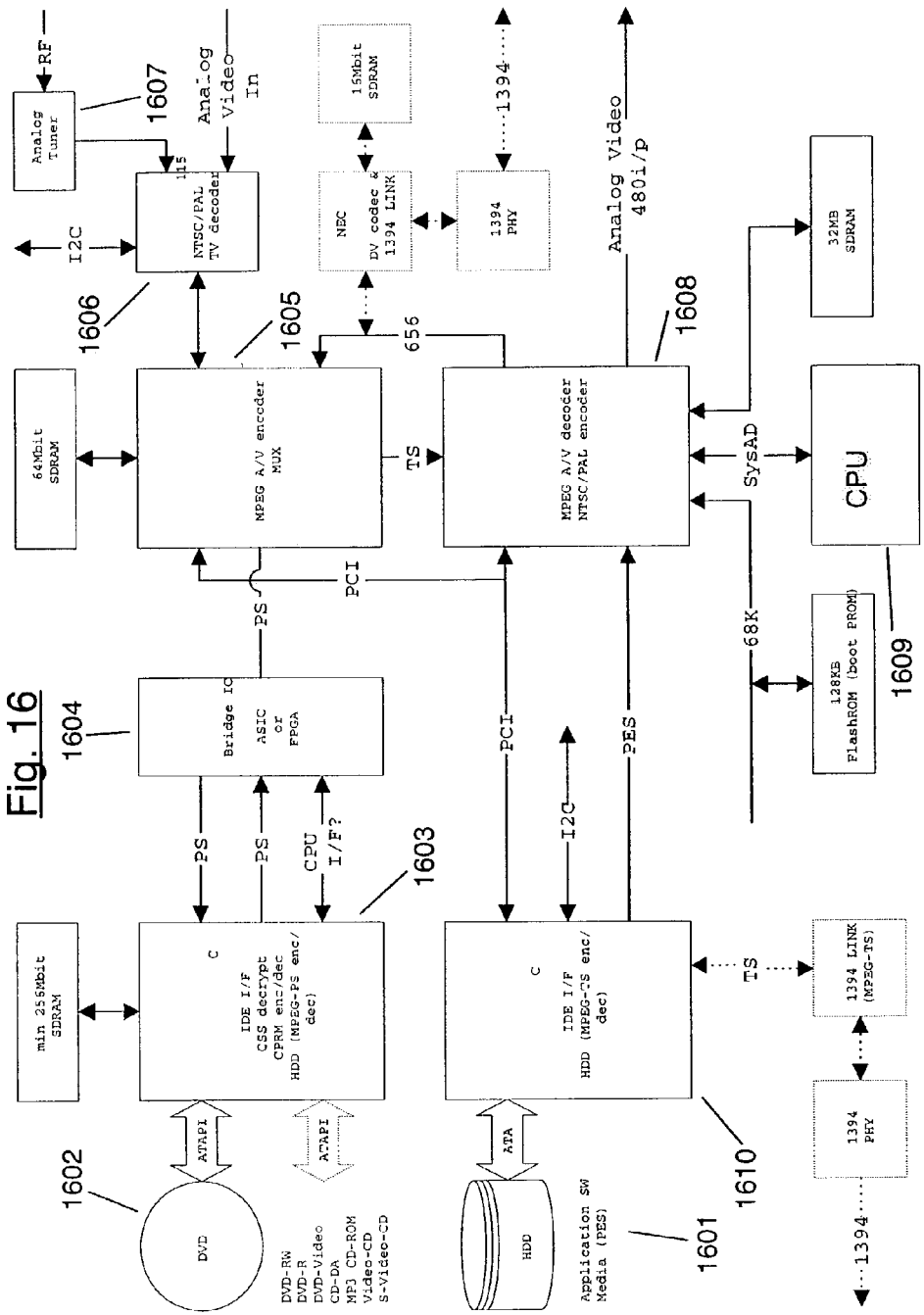
FIG. 16 is a block schematic diagram of an exemplary hardware implementation of a hard disk based digital video recorder with an integrated DVD player/recorder according to the invention.

Referring to FIG. 16, an exemplary block diagram of a hardware interface between a hard disk, DVD and encoding/decoding section of the invention is shown. The system is bi-directionally connected to a hard disk 1601 via an IDE interface 1610. A DVD player/recorder 1602 is also bi-directionally connected via an IDE interface 1603.

The CPU 1609 selects the source or the destination for data flow. The hard disk 1601 stores application software and recorded program material. When the hard disk 1601 is selected for output, program material flows from the hard disk 1601 through the IDE interface 1610 to the MPEG decoder 1608. The program material can be output to the viewer from the MPEG decoder 1608.

Program information can also flow between (to and from) the hard disk 1601 and the DVD player/recorder 1602. Data can be transferred from the DVD player/recorder 1602 via the IDE interface 1603 through the bridge 1604 to the MPEG encoder 1605. The data are passed through the MPEG encoder 1605 to the hard disk 1601 via the IDE interface 1610. The pass through occurs for MPEG data in both directions (DVD player/recorder 1602 to hard disk 1601 and hard disk 1601 to DVD player/recorder 1602).

Broadcast input enters through the tuner 1607 and is decoded by the NTSC/PAL decoder 1606. The decoded input is encoded into MPEG by the MPEG encoder 1605. The MPEG output is directed to the hard disk 1601 for storage and can be passed from the hard disk 1601 to the MPEG decoder 1608 for live TV feed to the viewer.

When the DVD player/recorder 1602 is used for playback of program material, the program material path flows through the MPEG decoder 1608 to the viewer or is stored temporarily on the hard disk 1601 before being sent through the MPEG decoder 1608 to the viewer.

The application software stored on the hard disk 1601 allows the CPU 1609 to display the contents of program material stored on the hard disk 1601 and a DVD inserted into the DVD player/recorder 1602 to the user. The user has full control of program material transferred between the hard disk 1601 and the DVD player/recorder 1602 through the application software.

A system as described in U.S. patent application Ser. No. 10/339,698 entitled Electronic Content Distribution and Exchange System, also owned by the Applicant, can be used to enhance the invention's DVD interface. DVDs that are recorded by the invention can be created in a way that prevents the DVD from being played on other DVRs or DVD players unless the DVR or DVD player is registered to the same user.

Figure 17:
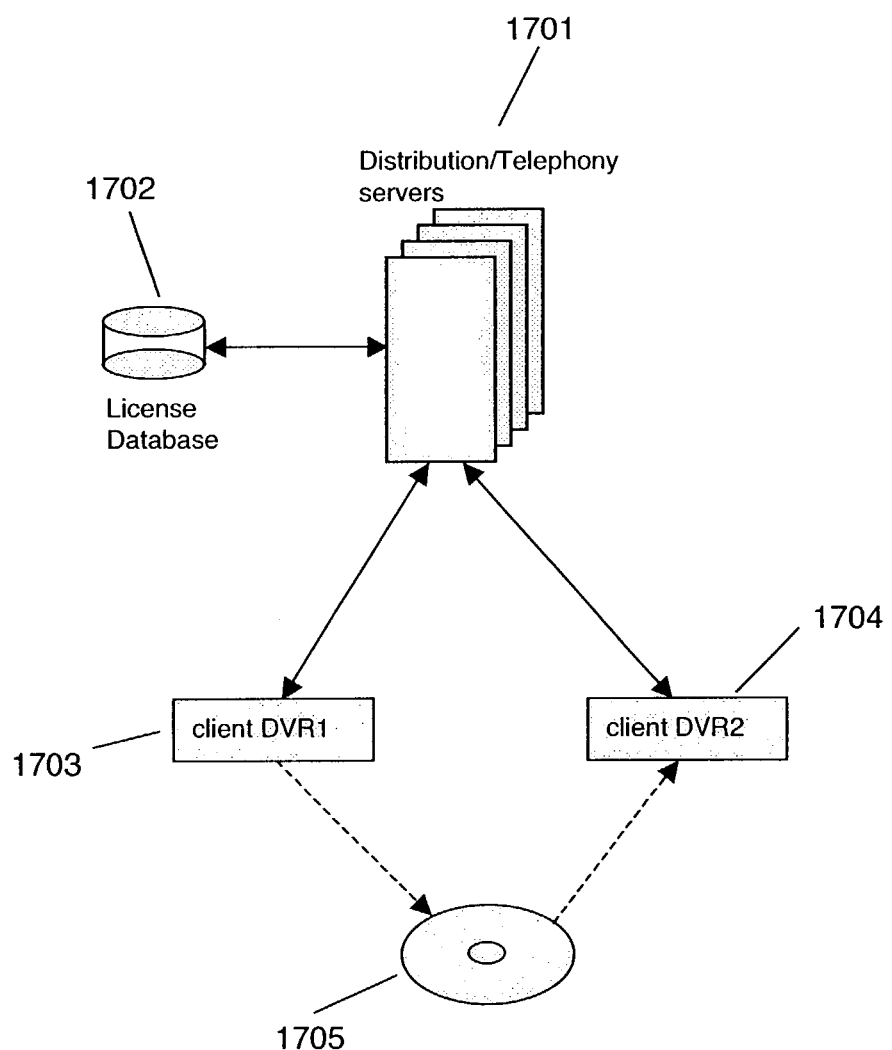
FIG. 17 is a block schematic diagram of a digital video recorder DVD copyright protection scheme according to the invention.

With respect to FIG. 17, a user owns DVR1 1703 and DVR2 1704. The user registers the DVR1 1703 and DVR2 1704 serial numbers with a central registry or license database server 1702. The central registry server 1702 creates a list of the DVRs owned by the user.

DVR1 1703 and DVR2 1704 are periodically updated with program guide information from distribution servers 1701. The distribution servers 1701 notify the user's DVRs of the DVRs that the user owns by sending the list created by the central registry server 1702. In this example, DVR1 1703 is aware that the user also owns DVR2 1704 and vice versa.

When a DVD 1705 is created on DVR1 1703, for example, the DVD 1705 has DVR1's serial number or encoded key written to the DVD 1705. When the DVD 1705 is inserted into DVR2 1704 for playback, DVR2 1704 reads the serial number or encoded key and verifies that the DVD 1705 was created by a DVR that the user owns by comparing the serial number or encoded key to the registry list. If the serial number or encoded key was not from a DVR that the user owns, then access to the DVD is denied. Here, DVR2 1704 finds that the DVD 1705 was created by DVR1 1703 which is on DVR2's list of valid DVRs. DVR2 1704 then plays or reads the DVD 1705.

This approach protects the copyright holder's material by enforcing a fair use of the material that the user has recorded. The user is not able to pass recorded DVDs to other users. The user can only use his recorded DVDs for his own backing up of program material and viewing or restoring of the backed up material.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method for the simultaneous storage and play back of multimedia data, comprising:
producing from television signals an MPEG formatted stream that includes video and audio components;
buffering by a media switch segments of video and audio components in a memory;
associating stream information with each segment of a plurality of segments of video and audio components
storing by the media switch the buffered video and audio components from the memory on one or more storage devices which contain previously stored segments of video and audio components that have associated stream information, the memory separate from the one or more storage devices;
sending by the media switch a particular segment of video and audio components from the memory to one or more decoders essentially simultaneously with the storing of the particular segment of video and audio components from the memory on the one or more storage devices;
decoding the particular segment of video and audio components into display output signals with the one or more decoders;
receiving a control command;
processing with at least a CPU the received control command and the associated stream information to send the previously stored video and audio components to the one or more decoders; and
mediating, by the media switch, between the CPU, the one or more storage devices, and the memory, the media switch operates asynchronously from the CPU.

2. The method of claim 1, further comprising separating the video and audio components for storage and play back.

3. The method of claim 1, wherein the associated stream information includes any of: location of I-frames, time stamps, random access information, or index information.

4. The method of claim 1, wherein the producing step further includes converting television signals from analog to digital and formatting the digital television signals in accordance with an MPEG standard.

5. The method of claim 1, further comprising parsing at least the video components to generate associated stream information.

6. The method of claim 1, wherein the parsing is performed by the media switch.

7. The method of claim 1, further comprising accepting the television signals by an input device.

8. A method for simultaneous storage and play back of multimedia data, comprising:
accepting multimedia data including video and audio data from at least one tuner;
requesting, by a source object, a buffer and filling, by the source object, the buffer with the video and audio data;
transferring, by a transform object, the video and audio data from the buffer to a storage device, the storage device is separate from the buffer;
storing the video and audio data from the buffer on the storage device;
controlling automatically, by the transform object, flow of the video and audio data from the at least one tuner to the storage device;

placing, by the transform object, a particular segment of video and audio data from the buffer into data stream buffers essentially simultaneously with the storing of the particular segment of video and audio data from the buffer on the storage device;

requesting, by a sink object to the transform object, for the data stream buffers that contain the particular segment of video and audio data;

supplying, by the transform object to the sink object, the data stream buffers that contain the particular segment of video and audio data;

outputting the particular segment of video and audio data from the data stream buffers to a decoder by the sink object, the sink object is automatically flow controlled by the transform object;

converting with the decoder the particular segment of video and audio data into display signals;

sending the display signals for display;

receiving control commands with a control object; and sending by the control object, in response to the control commands, flow command events to control flow of video and audio data through the source object, the transform object, and the sink object.

9. The method of claim 8, further comprising analyzing the video and audio data to generate stream information.

10. The method of claim 9, wherein the stream information includes any of: location of I-frames, time stamps, random access information, or index information.

11. The method of claim 8, wherein the source object obtains the buffer from the transform object.

12. An apparatus for the simultaneous storage and play back of multimedia data, comprising:
    a stream formatter that produces from television signals an MPEG formatted stream that includes video and audio components;
    a stream information associate that associates stream information with each segment of a plurality of segments of video and audio components;
    a memory for buffering by a media switch segments of video and audio components;
    one or more storage devices where the media switch stores the buffered video and audio components from the memory and which contain previously stored segments of video and audio components that have associated stream information, the memory separate from the one or more storage devices;
    one or more decoders that receive a particular segment of video and audio components from the memory from the media switch essentially simultaneously with the media switch storing the particular segment of video and audio components from the memory on the one or more storage devices;
    wherein the one or more decoders decode the particular segment of video and audio components into display output signals;
    a control command receiver that receives a control command;
    a CPU that processes the received control command and the associated stream information to send the previously stored video and audio components to the one or more decoders; and
    wherein the media switch mediates between the CPU, the one or more storage devices, and the memory and wherein the media switch operates asynchronously from the CPU.

13. The apparatus of claim 12, further comprising a video and audio component separator that separates the video and audio components for storage and play back.

14. The apparatus of claim 12, wherein the associated stream information includes any of: location of I-frames, time stamps, random access information, or index information.

15. The apparatus of claim 12, wherein the stream formatter converts the television signals from analog to digital and formats the digital television signals in accordance with an MPEG standard.

16. The apparatus of claim 12, further comprising a parser that parses at least the video components to generate associated stream information.

17. The apparatus of claim 16, wherein the parser is a component of the media switch.

18. The apparatus of claim 12, further comprising an input device that accepts the television signals.

19. An apparatus for simultaneous storage and play back of multimedia data, comprising:
    at least one tuner that accepts multimedia data including video and audio data;
    a buffer granted upon a request by a source object and filled with the video and audio data by the source object;
    a storage device that is separate from the buffer and receives from a transform object the video and audio data from the buffer;
    wherein the transform object automatically controls flow of the video and audio data from the at least one tuner to the storage device;
    wherein the storage device stores the video and audio data from the buffer;
    wherein the transform object places a particular segment of video and audio data from the buffer into data stream buffers essentially simultaneously with the storage device storing the particular segment of video and audio data from the buffer;
    a sink object that requests and receives from the transform object, the data stream buffers that contain the particular segment of video and audio data;
    a decoder that receives the particular segment of video and audio data from the data stream buffers from the sink object, the sink object is automatically flow controlled by the transform object;
    wherein the decoder converts the particular segment of video and audio data into display signals;
    wherein the display signals are sent for display;
    a control object that receives control commands; and
    wherein the control object sends, in response to the control commands, flow command events to control flow of video and audio data through the source object, the transform object, and the sink object.

20. The apparatus of claim 19, wherein the transform object analyzes the video and audio data to generate stream information.

21. The apparatus of claim 20, wherein the stream information includes any of: location of I-frames, time stamps, random access information, or index information.

22. The apparatus of claim 19, wherein the source object obtains the buffer from the transform object.

23. A non-transitory computer-readable storage medium carrying one or more sequences of instructions for simultaneous storage and play back of multimedia data, which instructions, when executed by one or more processors, cause the one or more processors to carry out the steps of:
    accepting multimedia data including video and audio data from at least one tuner;

requesting, by a source object, a buffer and filling, by the source object, the buffer with the video and audio data;

transferring, by a transform object, the video and audio data from the buffer to a storage device, the storage device is separate from the buffer;

controlling automatically, by the transform object, flow of the video and audio data from the at least one tuner to the storage device;

storing the video and audio data from the buffer in the storage device;

placing, by the transform object, a particular segment of video and audio data from the buffer into data stream buffers essentially simultaneously with the storing of the particular segment of video and audio data from the buffer on the storage device;

requesting, by a sink object to the transform object, for the data stream buffers that contain the particular segment of video and audio data;

supplying, by the transform object to the sink object, the data stream buffers that contain the particular segment of video and audio data;

outputting the particular segment of video and audio data from the data stream buffers to a decoder by the sink object, the sink object is automatically flow controlled by the transform object;

converting with the decoder the particular segment of video and audio data into display signals;

sending the display signals for display;

receiving control commands with a control object; and sending by the control object, in response to the control commands, flow command events to control flow of video and audio data through the source object, the transform object, and the sink object.

24. The non-transitory computer-readable storage medium of claim 23, further comprising analyzing the video and audio data to generate stream information.

25. The non-transitory computer-readable storage medium of claim 24, wherein the stream information includes any of: location of I-frames, time stamps, random access information, or index information.

26. The non-transitory computer-readable storage medium of claim 23, wherein the source object obtains the buffer from the transform object.

27. A non-transitory computer-readable storage medium carrying one or more sequences of instructions for simultaneous storage and play back of multimedia data, which instructions, when executed by one or more processors, cause the one or more processors to carry out the steps of:

producing from television signals an MPEG formatted stream that includes video and audio components;

buffering by a media switch segments of video and audio components in a memory;

associating stream information with each segment of a plurality of segments of video and audio components storing by the media switch the buffered video and audio components from the memory on one or more storage devices which contain previously stored segments of video and audio components that have associated stream information, the memory separate from the one or more storage devices;

sending by the media switch a particular segment of video and audio components from the memory to one or more decoders essentially simultaneously with the storing of the particular segment of video and audio components from the memory on the one or more storage devices;

decoding the particular segment of video and audio components into display output signals with the one or more decoders;

receiving a control command;

processing with at least a CPU the received control command and the associated stream information to send the previously stored video and audio components to the one or more decoders; and mediating, by the media switch, between the CPU, the one or more storage devices, and the memory, the media switch operates asynchronously from the CPU.

28. The non-transitory computer-readable storage medium of claim 27, further comprising separating the video and audio components for storage and play back.

29. The non-transitory computer-readable storage medium of claim 27, wherein the associated stream information includes any of: location of I-frames, time stamps, random access information, or index information.

30. The non-transitory computer-readable storage medium of claim 27, wherein the producing step further includes converting television signals from analog to digital and formatting the digital television signals in accordance with an MPEG standard.

31. The non-transitory computer-readable storage medium of claim 27, further comprising parsing at least the video components to generate associated stream information.

32. The non-transitory computer-readable storage medium of claim 31, wherein the parsing is performed by the media switch.

33. The non-transitory computer-readable storage medium of claim 27, further comprising accepting the television signals by an input device.

* * * * *